US012309861B2

(12) United States Patent
Chitrakar et al.

(10) Patent No.: US 12,309,861 B2
(45) Date of Patent: May 20, 2025

(54) COMMUNICATION DEVICE AND COMMUNICATION METHOD FOR MULTI-LINK BLOCK ACKNOWLEDGEMENT

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 266 days.

(21) Appl. No.: 17/782,142

(22) PCT Filed: Oct. 30, 2020

(86) PCT No.: PCT/SG2020/050620
§ 371 (c)(1),
(2) Date: Jun. 2, 2022

(87) PCT Pub. No.: WO2021/126075
PCT Pub. Date: Jun. 24, 2021

(65) Prior Publication Data
US 2023/0011167 A1    Jan. 12, 2023

(30) Foreign Application Priority Data
Dec. 20, 2019    (SG) .............................. 10201912856T

(51) Int. Cl.
*H04W 76/15*    (2018.01)
*H04L 1/1607*    (2023.01)
*H04W 74/0816*    (2024.01)

(52) U.S. Cl.
CPC ........... *H04W 76/15* (2018.02); *H04L 1/1621* (2013.01); *H04W 74/0816* (2013.01)

(58) Field of Classification Search
CPC . H04W 76/15; H04W 74/0816; H04W 84/12; H04L 1/1621; H04L 1/1635;
(Continued)

(56) References Cited

U.S. PATENT DOCUMENTS

2011/0103311 A1    5/2011    Navratil et al.
2018/0205502 A1    7/2018    Merlin et al.
(Continued)

FOREIGN PATENT DOCUMENTS

WO    2019177615 A1    9/2019

OTHER PUBLICATIONS

Extended European Search Report, dated Dec. 15, 2022, for European Patent Application No. 20901371.3. (10 pages).
(Continued)

*Primary Examiner* — Walli Z Butt
(74) *Attorney, Agent, or Firm* — Seed IP Law Group LLP

(57) ABSTRACT

Communication devices and methods for multi-link block acknowledgement are provided. One exemplary embodiment provides a multi-link device (MLD) configured to operate with a first plurality of affiliated stations, the first multi-link device comprising: circuitry, which in operation, initiates setup of a block acknowledgement agreement with a second multi-link device that is configured to operate with a second plurality of affiliated stations, wherein a link has been established between each station of the first plurality of stations and a corresponding station of the second plurality of stations; and a transmitter, which in operation, transmits frames of a Traffic Identifier (TID) on one or more links to the second multi-link device based on the block acknowledgement agreement, wherein the first plurality of stations
(Continued)

are configured to share a common transmit buffer that stores the frames of the TID to be transmitted to the second multi-link device and a common transmit buffer control to manage the transmission of the frames over the one or more links, and wherein each of the first plurality of stations is configured to maintain a per-link transmit buffer control to manage the transmission of the frames on a corresponding one of the one or more links.

14 Claims, 31 Drawing Sheets

(58) Field of Classification Search
CPC ... H04L 1/1874; H04L 1/1896; H04L 5/0055; H04B 1/04
See application file for complete search history.

(56) References Cited

U.S. PATENT DOCUMENTS

| | | |
|---|---|---|
| 2018/0206174 A1 | 7/2018 | Zhou et al. |
| 2019/0268099 A1 | 8/2019 | Chu et al. |
| 2019/0364555 A1 | 11/2019 | Huang et al. |
| 2021/0227502 A1* | 7/2021 | Huang ................ H04L 1/1614 |
| 2021/0409156 A1* | 12/2021 | Xu .................... H04L 1/1685 |
| 2022/0312522 A1* | 9/2022 | Jang .................... H04W 76/11 |
| 2022/0322473 A1* | 10/2022 | Hwang ................ H04W 76/15 |

OTHER PUBLICATIONS

Chitrakar et al., "Multi-link acknowledgement," IEEE 802.11-19/1512r6, Panasonic Corporation, Sep. 10, 2019. 16 pages.
Chu et al., "A-MPDU and BA," IEEE 802.11-19/1856r3, NXP, Nov. 6, 2019. 14 pages.
Huang et al., "Multi-link Operation Framework," IEEE 802.11-19/0773r8, Intel, Jul. 1, 2019. 19 pages.
International Search Report, mailed Jan. 29, 2021, for International Application No. PCT/SG2020/050620. 3 pages.
Singaporean Office Action, dated Feb. 29, 2024, for Singaporean Patent Application No. 11202250091E, 9 pages.
Examination Report, mailed Jan. 2, 2025, for Indian Patent Application No. 202227034865. (5 pages).

* cited by examiner

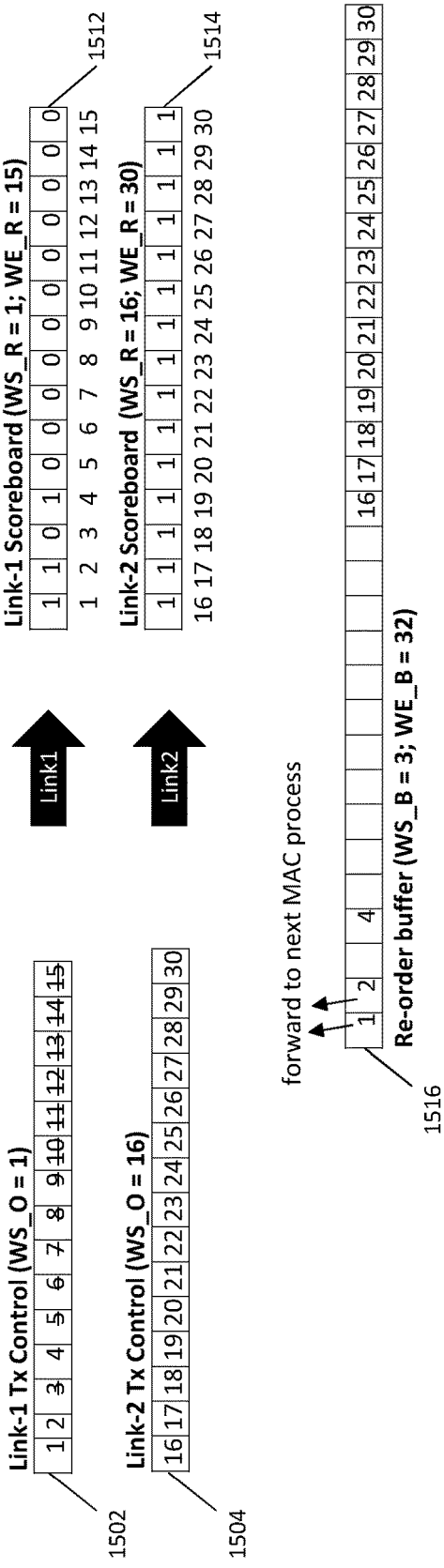
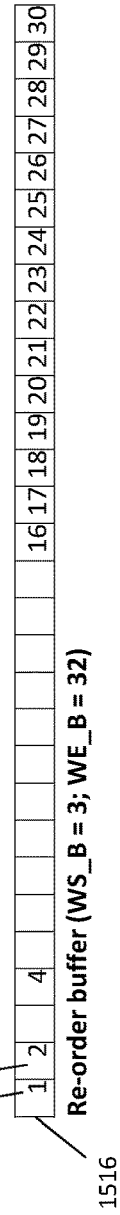
Figure 15A
Figure 15B

COMMUNICATION DEVICE AND COMMUNICATION METHOD FOR MULTI-LINK BLOCK ACKNOWLEDGEMENT

BACKGROUND

1. Technical Field

The present embodiments generally relate to communication devices, and more particularly relate to methods and devices for multi-link block acknowledgement that involves multi-link traffic streams.

2. Description of the Related Art

In today's world, communication devices are expected to wirelessly operate with the same capabilities as wired computing devices. For example, a user expects to be able to seamlessly watch a high definition movie streamed to the user's wireless communication device. This presents challenges for communication devices as well as the access points to which the communication devices wirelessly connect.

The Institute of Electrical and Electronics Engineers (IEEE) 802.11 group has recently formed the Extreme High Throughput (EHT) study group to address these challenges. Multi-link operation in the 2.4 GHz, 5 GHz and 6 GHz frequency bands has been identified as a key candidate technology for such communication. Multi-channel aggregation over multiple links is a natural way to create multi-fold increase in communication data throughput. In current IEEE 802.11 devices, when Admission Control is mandated for an Access Category (AC) by an access point (AP) (via, for example, Admission Control Mandatory (ACM) subfield(s) in an Enhanced Distributed Channel Access (EDCA) Parameter Set element), a communication device (STA) is required to set up a Traffic Stream (TS) for the AC with the AP (via an Add Traffic Stream (ADDTS) Request/Response exchange). A Block Ack agreement for the corresponding TIDs also needs to be performed (via an Add Block Ack (ADDBA) Request/Response exchange).

SUMMARY

One non-limiting and exemplary embodiment facilitates providing a multi-link device configured to operate with a first plurality of affiliated stations, the first multi-link device comprising: circuitry, which in operation, initiates setup of a block acknowledgement agreement with a second multi-link device that is configured to operate with a second plurality of affiliated stations, wherein a link has been established between each station of the first plurality of stations and a corresponding station of the second plurality of stations; and a transmitter, which in operation, transmits frames of a Traffic Identifier (TID) on one or more links to the second multi-link device based on the block acknowledgement agreement, wherein the first plurality of stations are configured to share a common transmit buffer that stores the frames of the TID to be transmitted to the second multi-link device and a common transmit buffer control to manage the transmission of the frames over the one or more links, and wherein each of the first plurality of stations is configured to maintain a per-link transmit buffer control to manage the transmission of the frames on a corresponding one of the one or more links.

Another non-limiting and exemplary embodiment facilitates providing a method for multi-link communication, comprising: initiating setup, at a first multi-link device, of a block acknowledgement agreement with a second multi-link device that is configured to operate with a second plurality of stations, the first multi-link device being configured to operate with a first plurality of stations, wherein a link has been established between each station of the first plurality of stations and a corresponding station of the second plurality of stations; and transmitting frames of a Traffic Identifier (TID) on one or more links to the second multi-link device based on the block acknowledgement agreement, wherein the first plurality of stations are configured to share a common transmit buffer that stores the frames of the TID to be transmitted to the second multi-link device and a common transmit buffer control to manage the transmission of the frames over the one or more links, and wherein each of the first plurality of stations is configured to maintain a per-link transmit buffer control to manage the transmission of the frames on a corresponding one of the one or more links.

It should be noted that general or specific embodiments may be implemented as a system, a method, an integrated circuit, a computer program, a storage medium, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 15A to 15D depicts illustrations of how failed multi-link transmissions may result in out of range scoreboard context and receive reordering buffer overflow in accordance with various embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

Figure 1:
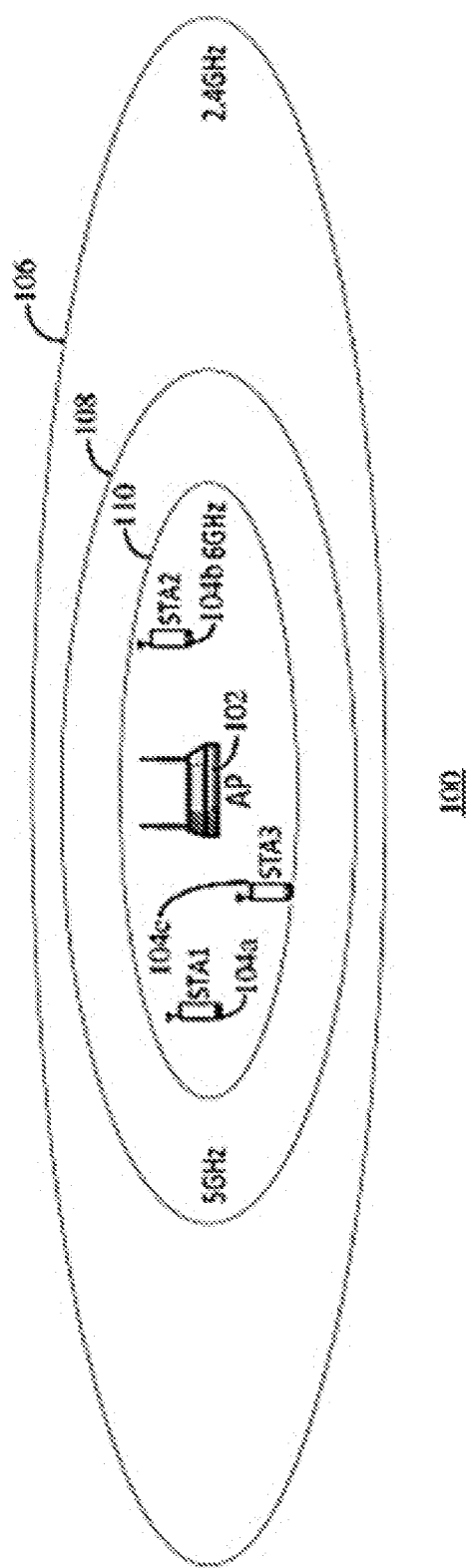
FIG. 1 depicts an illustration of an overview of an 802.11 wireless network basic service set (BSS) in accordance with various embodiments.

Referring to FIG. 1, an illustration depicts an overview of an 802.11 wireless network, also known as a basic service set (BSS), 100 which includes an access point (AP) 102, and multiple communication devices (STA) 104 connected to the AP 102; the AP 102 providing access to the Distribution System (DS), for example the internet, to the STAs. Current IEEE 802.11 BSSs operate on a single frequency band with an AP capable of concurrently operating on multiple frequency bands acting as an independent (single link) AP on each frequency band. Most present 802.11 STAs are single band devices and are capable of only joining one BSS (on a particular frequency band) at any one time, while future 802.11 communication devices (e.g., extreme high throughput (EHT) communication devices) are expected to be capable of concurrently operating on multiple frequency bands. A multi-link capable STA may be termed as a non-AP MLD. Such non-AP MLDs may concurrently join multiple BSSs at the same time and may setup multiple communication links with the AP over multiple frequency bands or even on multiple frequency separated channels on the same frequency band. Such APs capable of concurrently communicating with a non-AP MLDs over multiple links may be termed as AP MLDs. In FIG. 1, AP 102 represents a AP MLD and the STAs 104 represent non-AP MLDs; the AP MLD and non-AP MLDs all capable of concurrently communicating in the 2.4 GHz frequency band, the 5 GHz frequency band, and the 6 GHz frequency band. Such future AP 102 may setup BSSs in the 2.4 GHz frequency band, the 5 GHz frequency band, or the 6 GHz frequency band as separate BSSs as in existing 802.11 systems, in which case legacy STAs may join the BSSs on three frequency bands following legacy Authentication and Association procedures. Alternatively, the AP may also operate a unified/virtual BSS that operates on multiple frequency bands (i.e., the 2.4 GHz frequency band 106, the 5 GHz frequency band 108, and the 6 GHz frequency band 110) as shown in the BSS 100. In either case, the STAs 104 are assumed to have joined the unified/virtual BSS 100 on all three frequency bands either through individual Authentication and Association Request/Responses on each frequency band or through multi-link setup negotiation (e.g. Authentication and Association Request/Responses) on any one of the frequency bands.

Figure 2:
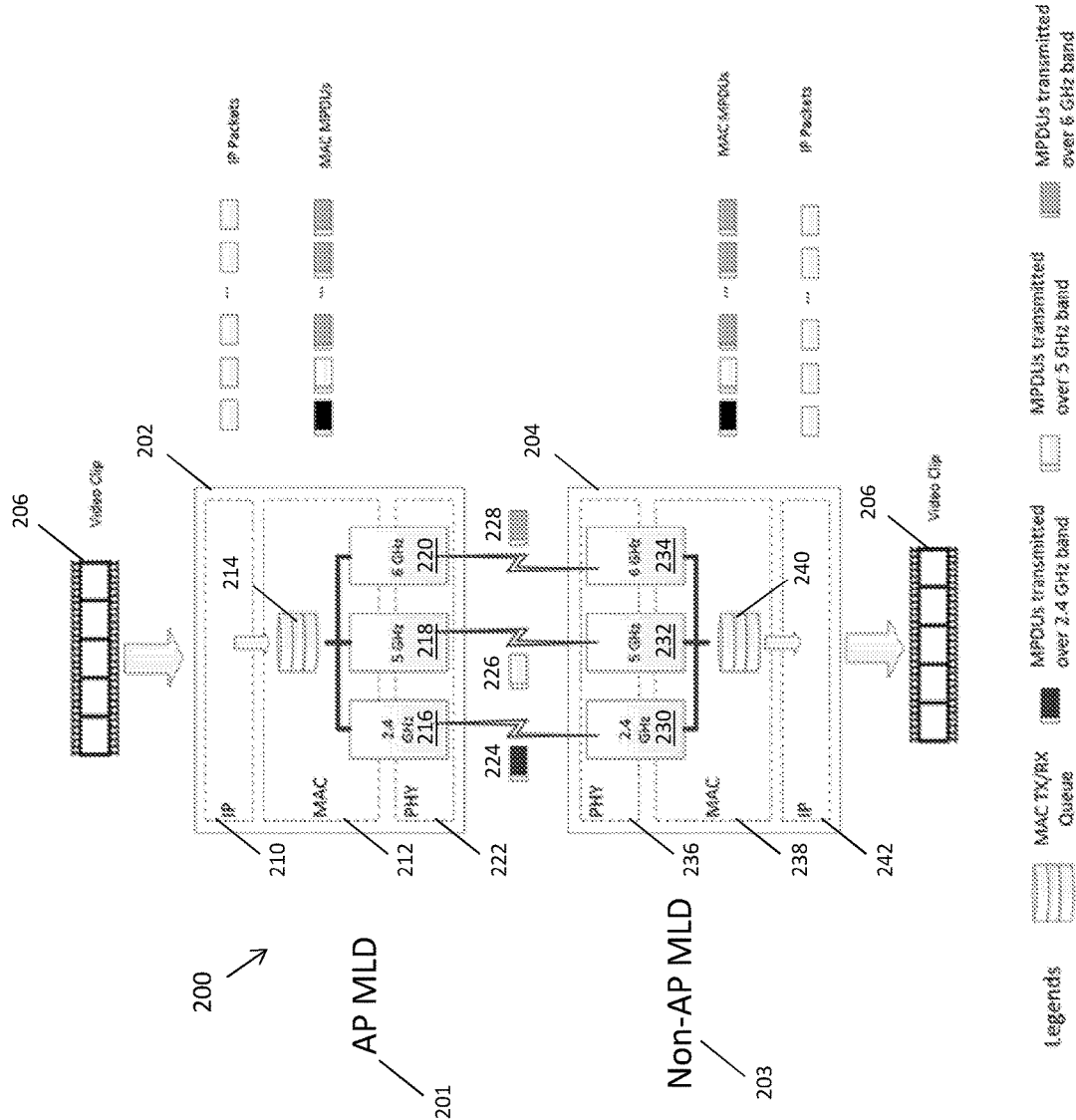
FIG. 2 depicts an illustration of communication from an originator multi-link device (MLD) to a recipient MLD in accordance with various embodiments.

FIG. 2 depicts an illustration 200 of communication of a video file 202 from an AP MLD 201 to a non-AP MLD 203. In order to fully realize the throughput gains of multi-link aggregation, Traffic Stream (TS) and Block Acknowledgement (BA) mechanisms that operate over multiple links are desired. Such multi-link TS and BA can help to achieve multiple fold increase in device throughput by enabling aggregation of traffic over multiple links (e.g., 2.4 GHz 204, 5 GHz 206 and 6 GHz 208). In case there are no restrictions on any link for traffics of any Traffic Identifier (TID) i.e. Admission Control is not mandated for any Access Category (AC) on any link, setup of multi-link TS is optional. Streaming of the high resolution video 206 (e.g. high definition (HD) or 4K or 8K video) may require such multi-link transmissions. At the Internet Protocol (IP) layer 210 of the AP MLD 201, the video file 206 is split into small IP packets. The 802.11 Media Access Control (MAC) layer 212 of the AP MLD 201 converts the IP packets into 802.11 MAC layer Protocol Data Units (MPDUs) and feeds them into a MAC TX queue 214 which in turn provides the MPDUs to transceivers 216, 218, 220 in the lower MAC layer 212 and the physical layer (PHY) 222 for simultaneous transmission on the frequency bands 2.4 GHz, 5 GHz and 6 GHz, respectively. In this manner, the MPDUs 224 are transmitted over the 2.4 GHz frequency band, the MPDUs 226 are transmitted over the 5 GHz frequency band and the MPDUs 228 are transmitted over the 6 GHz frequency band to the non-AP MLD 203.

At the non-AP MLD 203, the MPDUs 224, 226, 228 are received by transceivers 230, 232, 234 in the PHY layer 236 and the lower MAC layer 238. The MPDUs 224, 226, 228 are collected by the MAC layer 238 and re-ordered if necessary before being passed to the MAC RX queue 240 and up to the IP layer 242 where the IP packets are combined to form back the original video file 206.

In current 802.11 communication devices, Admission Control is usually mandated to maintain Quality of Service (QoS) levels for high priority traffic such as video (AC_VO) or voice (AC_VI). When Admission Control is mandated for an Access Category (AC) by the AP MLD (e.g., via an Admission Control Mandatory (ACM) subfield in the Enhanced Distributed Channel Access (EDCA) parameter Set element), a non-AP MLD may be required to set up a TS for the Access Category (AC) with the AP MLD via an Add Traffic Stream (ADDTS) Request/Response exchange. A Traffic Specification (TSPEC) element in the ADDTS Request frame and the ADDTS Response frame specifies the various parameters related to the TS including Traffic Stream Identifier (TSID), direction, MAC Service Data Unit (MSDU) size, minimum and maximum interval range, and minimum, mean and peak data rates, etc. In case there are no restrictions on any link for traffics of any Access Category (AC) i.e. Admission Control is not mandated for any AC on any link, setup of multi-link TS is optional.

Block Ack agreement for corresponding TIDs also needs to be performed via an Add Block Ack (ADDBA) Request/Response exchange. Traffic Stream and Block Ack agreements may also be setup for a different frequency band by including a multi-band element in the ADDTS and ADDBA Request/Response exchange respectively or via On-channel Tunneling (OCT).

Since the unmanaged addition of new high priority traffic to a wireless network may have adverse effect on the QoS of existing traffic, AP MLDs usually mandate Admission Control for such traffic. In the event that there is a high volume of existing traffic, the AP MLD may refuse a non-AP MLD's request to set up Traffic Streams for that Access Category (AC).

Figure 3:
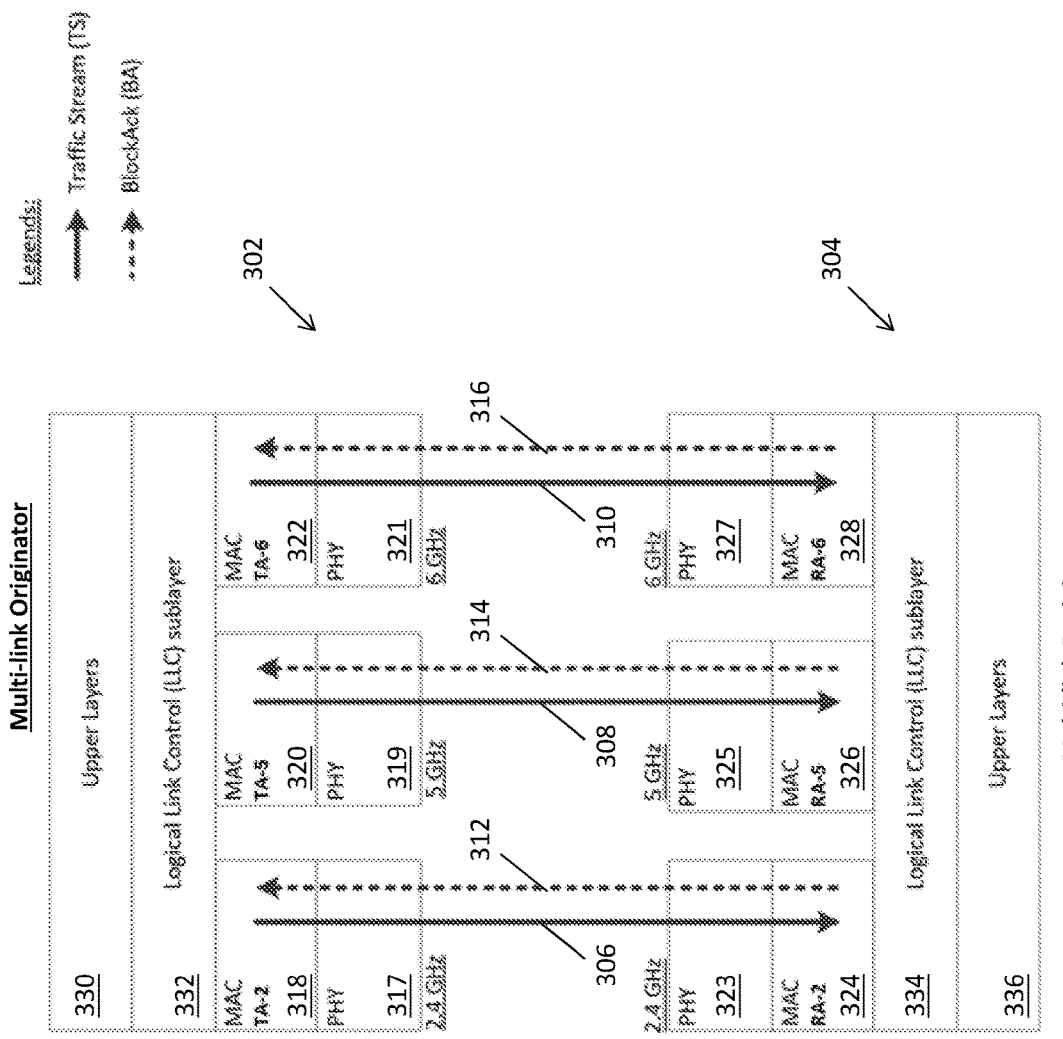
FIG. 3 depicts an illustration of setup of Traffic Stream (TS) and Block Ack (BA) agreements for a traffic identifier (TID) in accordance with various embodiments.

In order to achieve multi-link transmission in accordance with present embodiments, changes to the TS and BA operation will be required since present TS and BA setup is set up between the MAC layers on a particular link. Referring to FIG. 3, an illustration 300 depicts Traffic Stream (TS) and Block Ack (BA) agreements for a traffic identifier (TID) which are set up between a multi-link originator 302 and a multi-link recipient 304 in accordance with the present embodiment. TS and BA agreements are usually setup up as a pair with the BA agreement being setup in opposite direction to the TS direction. The TSs 306, 308, 310 are set up between transmitting MAC layers 318, 320, 322 of each link and corresponding receiving MAC layers 324, 326, 328 of each link for data transmission from the multi-link originator 302 to the multi-link recipient 304, while the BA agreements 312, 314, 316 are set up in opposite directions between the receiving MAC layers 324, 326, 328 and the transmitting MAC layers 318, 320, 322 for the transmission of BAs from the multi-link recipient 304 to the multi-link originator 302 to acknowledge the data transmissions corresponding to the TSs 306, 308, 310, respectively.

Figure 4:
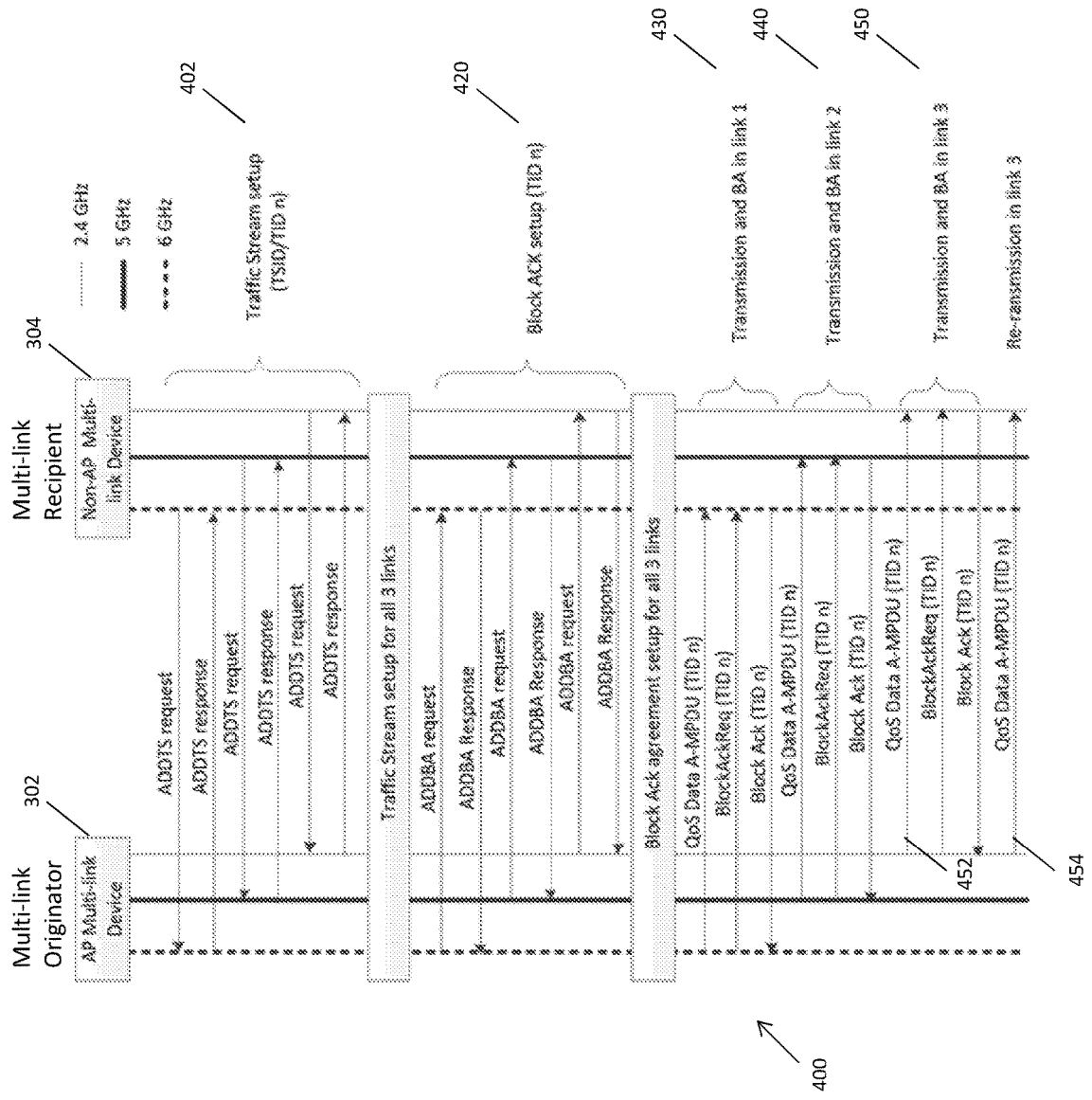
FIG. 4 depicts communication flow between an AP MLD 102 and a non-AP MLD 104 for TS and BA setup over multiple bands/links and communication thereafter in accordance with current multi-link communication.

At the multi-link originator end, Upper Layers 330 and a Logical Link Control (LLC) layer 332 make decisions of which link to use for transmission for a particular TID. MPDUs of each TS 306, 308, 310 are generated at the transmitting MAC layers of each link (MAC layers 318, 320, 322) and addressed to the peer receiving MAC layers of the same link (MAC layers 324, 326, 328). At the receiving end, reordering of MAC Service Data Units (MSDUs) received over different links are done by the receiving LLC layer 334 and passed to receiving Upper Layers 336. Block Acks (BA) corresponding to the MPDUs of each TS 306, 308, 310 are generated at the receiving MAC layers of the same link (MAC layers 324, 326, 328) and addressed to the peer transmitting MAC layers of each link (MAC layers 318, 320, 322). When a BA is not received or MPDUs are not acknowledged in a BA bitmap (the bits corresponding to the MPDUs set to 0), it is determined that transmission has failed for the unacknowledged MPDUs. MAC layer re-transmission of the unacknowledged MPDUs occurs in the same frequency band (2.4 GHz, 5 GHz, 6 GHz) as the failed transmission as shown in FIG. 4. It is also possible that instead of setting up Traffic Streams (TS) to restrict traffic of particular TIDs to a particular link, some sort of TID mapping negotiation may be performed between an AP MLD and a non-AP MLD to map certain TIDs to particular links, e.g. video traffics are exclusively mapped to the 6 GHz link, and audio traffics are exclusively mapped to the 5 GHz link, while rest of the traffic are mapped to the 2.4 GHz link. In absence of either TS setup or TID mapping, it is assumed that traffic of any TID may be transmitted on any link by default.

FIG. 4 depicts communication flow 400 between the multi-link originator 302 (an AP MLD in this example) and the multi-link recipient 304 (a non-AP MLD in this example) for TS and BA setup and communication thereafter in accordance with current multi-link communication. If the EDCA parameter Set element received in beacon frames in any link has the Admission Control Mandatory (ACM) bit set for any Access Category (AC), a non-AP MLD (such as the multi-link recipient 304) is required to set up a Traffic Stream (TS) with the multi-link originator 302 for the corresponding TID(s) prior to transmitting a data frame belonging to that TID/AC on that link. TS setup 402 for a particular TID are performed individually for each link, for example for downlink data transmission (i.e., from an AP MLD to non-AP MLD), by exchanging ADDTS Request/Response frames on each link. ADDTS Requests are always initiated by non-AP MLDs regardless of the direction of the actual data transmission. Similarly, BA setup 404 for a particular TID is performed individually for each link by exchanging ADDBA Request/Response frames on each link. The ADDBA Requests are initiated by the multi-link originator for the corresponding TS. Once the TS and BA have been setup in each link, the data transmissions and corresponding BA transmission can take place in each link, for example 430 in the 6 GHz band, 440 in the 5 GHz band and 450 in the 2.4 GHz band. BlockAck frames for data transmission in each link 430, 440, 450 are solicited via BlockAckReq frames and the requested BlockAck frame is transmitted on the same link. Since transmissions 430, 440 and 450 take place on different links, they may also occur at the same time or during overlapping times, thereby achieving multi-link transmission.

When it is determined that transmission of a data frame has failed (e.g., within the data transmission 452, as indicated in the BlockAck frame), the data frame is retransmitted on the same link (e.g., retransmission 454).

Although multi-link transmissions may be achieved with this approach, the onus of the scheduling, band selection, re-transmission and other duties are left to the upper layers 330, 336 (FIG. 3), which may not have the PHY layers 317, 319, 321, 323, 325, 327 information required to make such a decision. It would be better if the multi-link transmission decisions are taken at the MAC layers 318, 320, 322, 324, 326, 328 since the MAC layer has much better information/control of the PHY layers.

Figure 5:
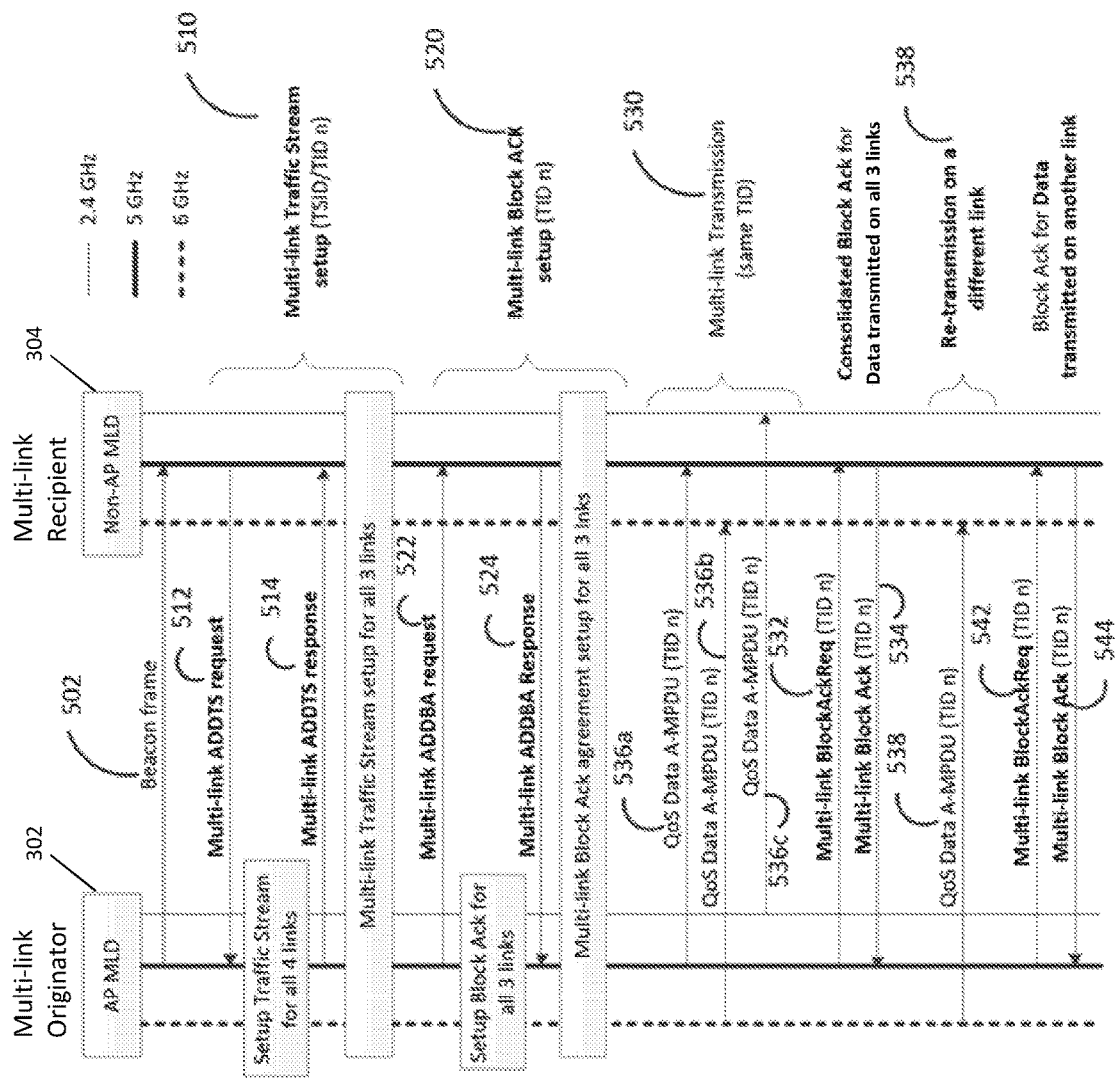
FIG. 5 depicts communication flow between the AP MLD 102 and the non-AP MLD 104 for multi-link TS and multi-link BA setup and communication thereafter in accordance with various embodiments.

FIG. 5 depicts communication flow between the multi-link originator 302 and the multi-link recipient 304 for TS and BA setup and communication thereafter in accordance with present embodiments. The multi-link originator 302 may choose to listen to Beacon frames transmitted on a single link in order to save power. Aside from the legacy EDCA parameter Set element, the Beacon frame 502 on a primary link (e.g., the 5 GHz band) may carry a multi-band EDCA parameter Set element to indicate the EDCA parameters for a link other than the link on which the Beacon frame 502 is transmitted. If an ACM bit in the Beacon frame 502 is set to "1" for any of the AC in any of the links, the multi-link recipient 304 is required to set up a Traffic Stream (TS) for the TIDs corresponding to that AC on the indicated link(s) prior to transmitting a Data frame belonging to that TID/AC on that link(s). Alternatively, the multi-link recipient 304 may also have received Beacon frames separately on each link with the legacy EDCA parameter Set element carrying the ACM bit set to "1".

Figure 10:
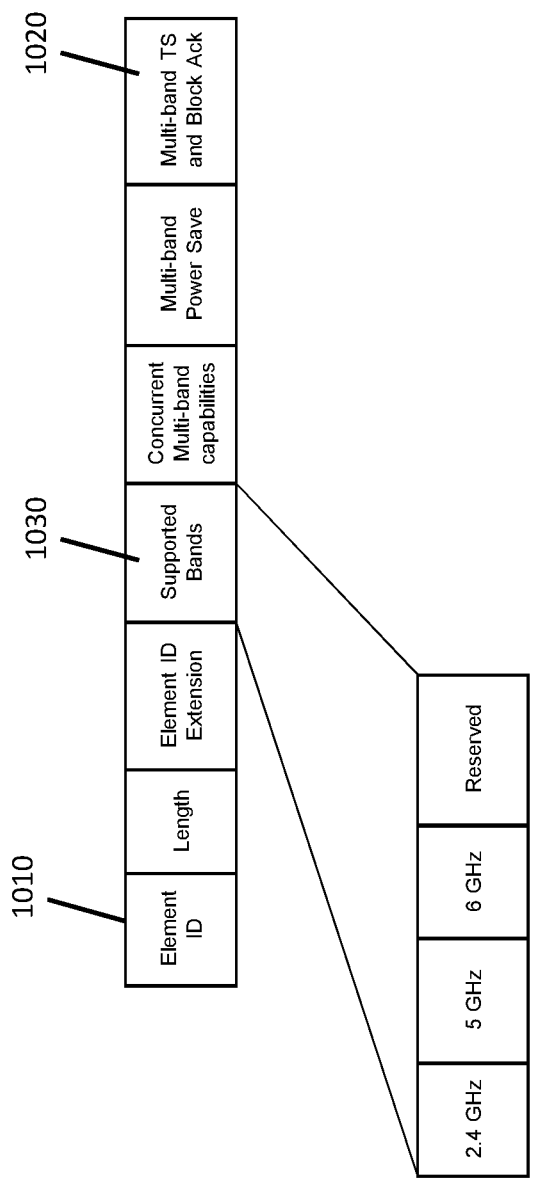
FIG. 10 depicts an illustration of a multi-band capability element in accordance with various embodiments.

If both the originator and recipient support multi-link TS and multi-link BA and have indicated a capability in the Multi-link TS and Block Ack field in the multi-link capability element (the multi-link capability element, including the Multi-link TS and Block Ack field, is discussed in more detail in FIG. 10), multi-link TS setup 510 (e.g. for downlink traffic) for a particular TID applicable for multi-links (for example the three bands: 2.4 GHz, 5 GHz and 6 GHz) may be performed using a single frame exchange (e.g., on channels in the primary link) in accordance with present embodiments. Similarly, the corresponding multi-link BA setup 520 for the TID applicable for multi-links (for example, the three bands: 2.4 GHz, 5 GHz and 6 GHz) may be performed using a single frame exchange (e.g., on channels in the primary link) in accordance with present embodiments. A Multi-link ADDTS Request frame 512 and a Multi-link ADDTS Response frame 514 are used to negotiate TS setup 516 for a TID over multiple links. Similarly, a Multi-link ADDBA Request 522 and Multi-link ADDBA Response 524 are used to negotiate BA setup 526 for a TID over multiple links. In this downlink traffic example, the Multi-link ADDBA Request 522 is transmitted by the AP 102 to the multi-link recipient 304, which may be any one of the non-AP MLDs 104. If the multi-band TS setup 510 was for uplink traffic, the Multi-band ADDBA Request would be would be transmitted in the opposite direction, i.e. by the multi-link recipient 304 to the multi-link originator 302.

Once the multi-link TS and the multi-link BA have been setup in multiple links, the multi-link originator 302 may proceed to initiate the multi-link transmission 530 to the multi-link recipient 304. The multi-link transmission 530 involves simultaneous transmission of frames belonging to the same TS (TID/AC) within the QoS Data A-MPDUs 536a, 536b and 536c, respectively, to the multi-link recipient 304 over the three links.

Upon completion of the multi-link transmission 530, the multi-link originator 302 may transmit a multi-link BlockAckReq 532 to the multi-link recipient 304 on any of the links (e.g., on the primary link) to solicit a multi-link Block Ack, acknowledging the frames 536a, 536b, 536c received on the three links. Upon receiving the multi-link BlockAckReq 532 from the multi-link originator 302, the multi-link recipient 304 transmits the multi-link Block Ack 534 on the same link on which the multi-link BlockAckReq 532 was received to indicate that the multi-link recipient 304 successfully received QoS Data A-MPDUs 536a and 536b but failed to receive the QoS Data A-MPDU 536c transmitted on the 2.4 GHz band. In order to improve the success rate of retransmission by using frequency diversity, the multi-link originator 302 may, in accordance with present embodiments, choose to retransmit the QoS Data A-MPDU 538 on the 6 GHz band instead of the 2.4 GHz band used for the original transmission.

The multi-link originator 302 subsequently transmits a multi-link BlockAckReq 542 to the multi-link recipient 304 on a different link (e.g., on the primary 5 GHz link) to solicit the multi-link Block Ack 544 which carries a consolidated BA bitmap acknowledging the frames received on the 6 GHz bands. Thus, it can be seen that in accordance with the present embodiments, a Traffic Stream is setup across multiple links using a single Multi-link ADDTS frame exchange 512, 514 on any one link. The Block Ack is also setup across multiple links using a single Multi-link ADDBA frame exchange 522, 524 on any one link. In addition, in accordance with present embodiments, a consolidated Multi-link BlockAck frame 534 acknowledges a multi-link aggregated transmission, a multi-link BlockAck frame 544 may be used to acknowledge transmission in another link, and failed frames 536c may be re-transmitted 538 on a different link.

Thus, in accordance with present embodiments, an MLD (e.g., AP MLD 102) includes a plurality of transceivers 216, 218, 220 which, in operation, each transmit signal frames 536c, 536a, 536b on different ones of a plurality of frequency bands 204, 206, 208. The MLD also includes Media Access Control (MAC) circuitry 212 coupled to the plurality of transceivers 216, 218, 220 which, in operation, generates a multi-link block acknowledgement request frame 532 and transmits the MAC multi-link block acknowledgement request frame 532 on the one of the plurality of frequency bands 206 to solicit the multi-link block acknowledgement frame 534. The Media Access Control (MAC) circuitry 212 subsequently receives a multi-link block acknowledgement frame 534 on one of the plurality of frequency bands 206 acknowledging the signal frames 536a, 536b, 536c transmitted on the plurality of frequency bands.

In addition, in accordance with present embodiments, an MLD (e.g., non-AP MLD 104) includes a plurality of transceivers 230, 232, 234 coupled to the MAC circuitry 238. The plurality of transceivers 230, 232, 234, in operation, each receive signal frames 536a, 536b, 536c on different ones of a plurality of frequency bands 204, 206, 208.

The MAC circuitry 238, in operation, upon receiving the multi-link block acknowledgement request frame 532 on one of the plurality of frequency bands 206, generates and transmits a multi-link block acknowledgement frame 534 on one of the plurality of frequency bands 206 acknowledging the signal frames 536a, 536b, 536c received on the plurality of frequency bands 204, 206, 208.

Figure 6:
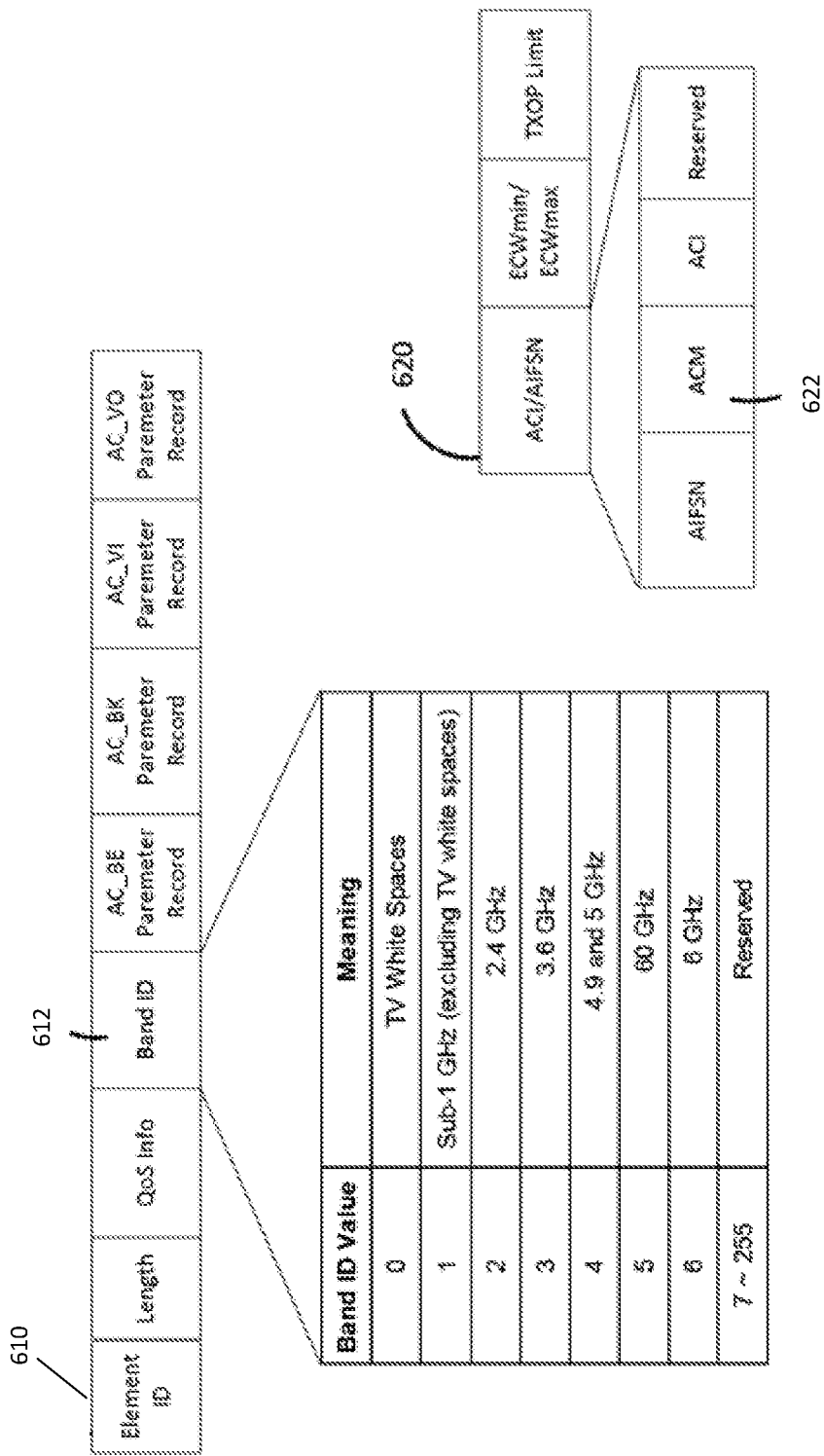
FIG. 6 depicts an illustration of a multi-link Enhanced Distributed Channel Access (EDCA) parameter set element in accordance with various embodiments.

FIG. 6 depicts an illustration 600 of a multi-link EDCA parameter set element 610 in a Beacon frame 402 (FIG. 4) in accordance with present embodiments. The multi-link EDCA parameter Set element 610 indicates the EDCA parameters for a link other than the link on which the Beacon frame 402 is transmitted. The applicable link is indicated by a Band ID field 612. A format of each of the Parameter Record field 620 for a particular AC is depicted. If the ACM bit 622 is set to "1" for any of the AC in any of the links, a non-AP MCD is required to set up a Traffic Stream (TS) for the TIDs corresponding to that AC on the indicated link prior to transmitting a Data frame belonging to that TID/AC on that link. Alternatively, instead of the Band ID field 612, a Multi-link field may be present in the EDCA Parameter set element 610 to indicate the applicable link. Alternatively, the non-AP MCD may also receive Beacon frames separately on each link with the legacy EDCA parameter Set element carrying the ACM bit 622 set to "1".

Figure 7:
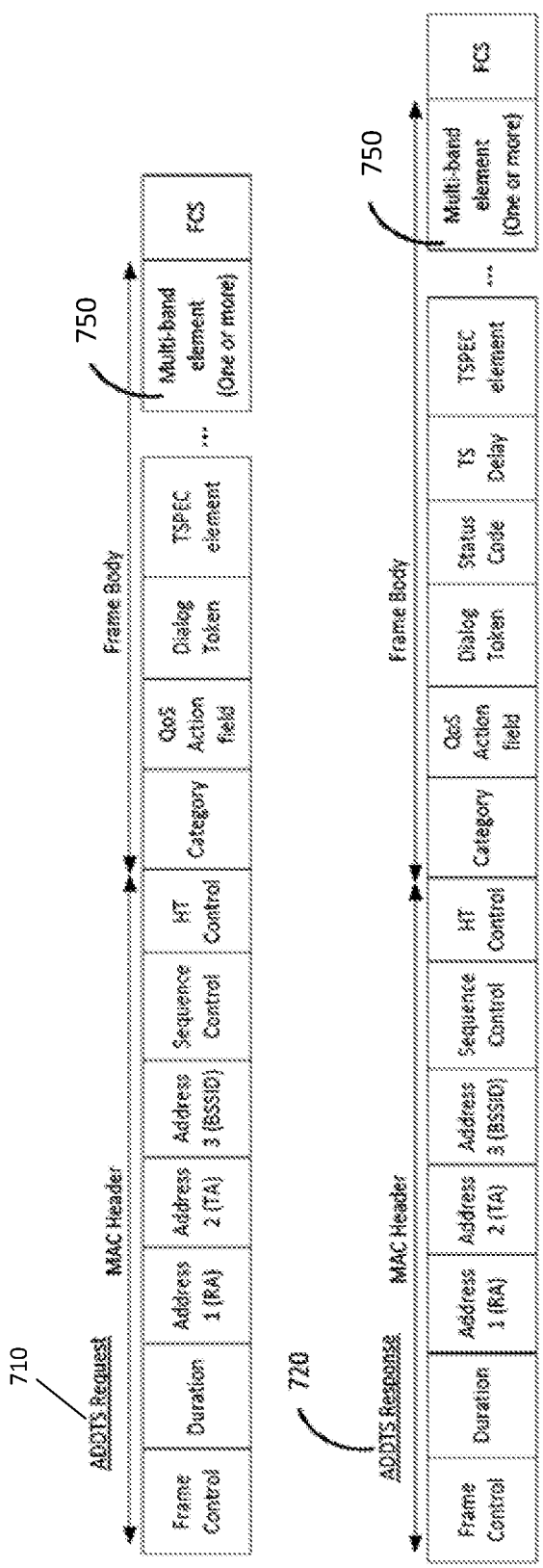
FIG. 7 depicts an illustration of a multi-link ADDTS Request frame and a multi-link ADDTS Response frame in accordance with various embodiments.
Figure 8:
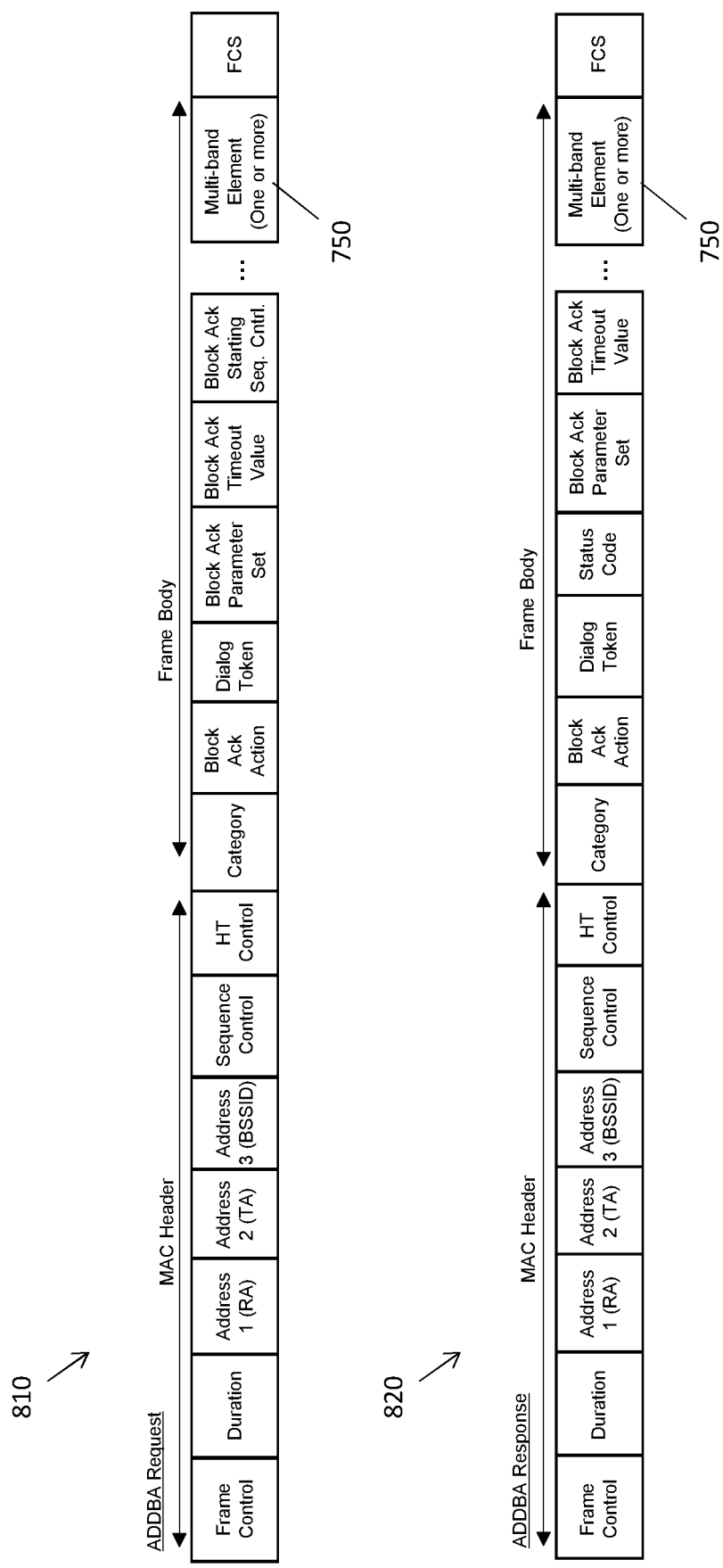
FIG. 8 depicts an illustration of a multi-link ADDBA Request frame and a multi-link ADDBA Response frame in accordance with various embodiments.

FIG. 7 depicts an illustration 700 of a multi-link ADDTS Request frame 710 and a multi-link ADDTS Response frame 720 and FIG. 8 depicts an illustration 800 of a multi-link ADDBA Request frame 810 and a multi-link ADDBA Response frame 820 in accordance with present embodiments. The multi-link ADDTS Request frame 710 and the multi-link ADDTS Response frame 720 are used to negotiate TS setup for a TID over multiple links in response to information in one or more multi-band elements 750 in each of the multi-link ADDTS Request frame 710 and the multi-link ADDTS Response frame 720. Similarly, the multi-link ADDBA Request frame 810 and the multi-link ADDBA Response frame 820 are used to negotiate BA setup for a TID over multiple links in response to information in one or more multi-band elements 750 in each of the multi-link ADDBA Request frame 810 and the multi-link ADDBA Response frame 820.

Figure 9:
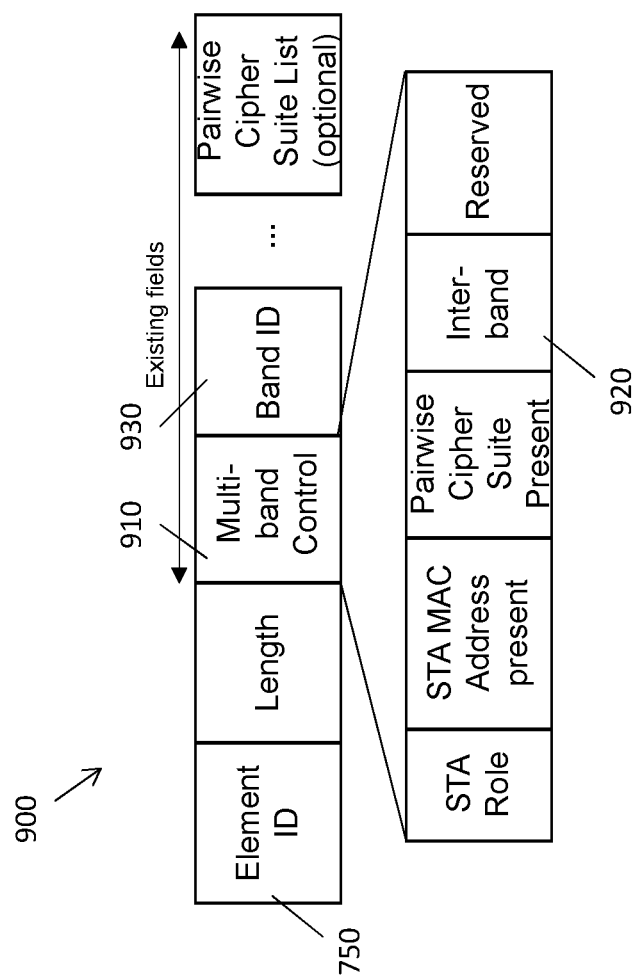
FIG. 9 depicts an illustration of a multi-band element in FIGS. 7 and 8 in accordance with various embodiments.

Referring to FIG. 9, an illustration 900 depicts the multi-band element 750 in accordance with present embodiments. The multi-band element 750 indicates the additional band (aside from the transmitted link) to which the TS or BA agreement applies. The multi-band element 750 may also include the MAC address used in the link.

The multi-band element 750 includes among other fields a Multi-band control field 910 which includes several fields including an Inter band field 920. The Inter-band field 920 is used to differentiate the multi-band element for use in Multi-link TS and BA setup. When the Inter band field 920 is set to "1", it indicates that the corresponding setup applies to the link indicated in the Band ID field 930 in addition to the link on which the frame carrying the element is transmitted. The Inter band field 920 thus serves to differentiate the inclusion of the Multi-band element 750 for multi-link ADDTS and multi-link ADDBA setup in accordance with present embodiments from the legacy usage for ADDTS and ADDBA setup on a different link.

In FIGS. 7 and 8, each of the multi-link ADDTS Request frame 710, the multi-link ADDTS Response frame 720, the multi-link ADDBA Request frame 810, and the multi-link ADDBA Response frame 820 include two multi-band elements 750 with the inter band field 920 set to "1" and the Band ID fields 930 set to 2.4 GHz in first multi-band element 750 and 6 GHz in the second multi-band element 750. Since the frames are transmitted on the 5 GHz band, this indicates a multi-link setup on the three links.

Although in this example, the multi-link ADDBA Request 810 is transmitted by the multi-link originator 302 to the multi-link recipient 304, if the multi-link TS setup 510 was for uplink traffic, the multi-link ADDBA Request would be transmitted by the multi-link recipient 304 to the multi-link originator 302. Once the TS and BA have been setup in multi-link, the AP 102 can proceed to initiate the multi-link transmission 530 to the STA 104, the multi-link transmission 530 involving simultaneous transmission of frames belonging to the same TS (TID/AC) to the multi-link recipient 304 over the three links.

FIG. 10 depicts an illustration 1000 of a multi-band capability element 1010 in accordance with various embodiments. If both the originator and recipient support multi-link TS and multi-link BA and have indicated the capability in the Multi-band TS and Block Ack field 1020 in the multi-band capability element 1010, multi-band TS setup 510 (downlink traffic) and multi-band BA setup 520 for a particular TID applicable for multi-links may be performed using a single frame exchange on, for example, channels in the primary link. The Multi-band TS and Block Ack field 1020 also indicates whether the AP 102 and the STA 104 support the multi-link TS and the multi-link BA feature and a Supported Bands field 1030 indicates the frequency bands supported by the AP 102 and the STA 104. It is also possible that the capabilities for the multi-link TS feature and multi-link BA feature are signaled separately in different fields.

Figure 11:
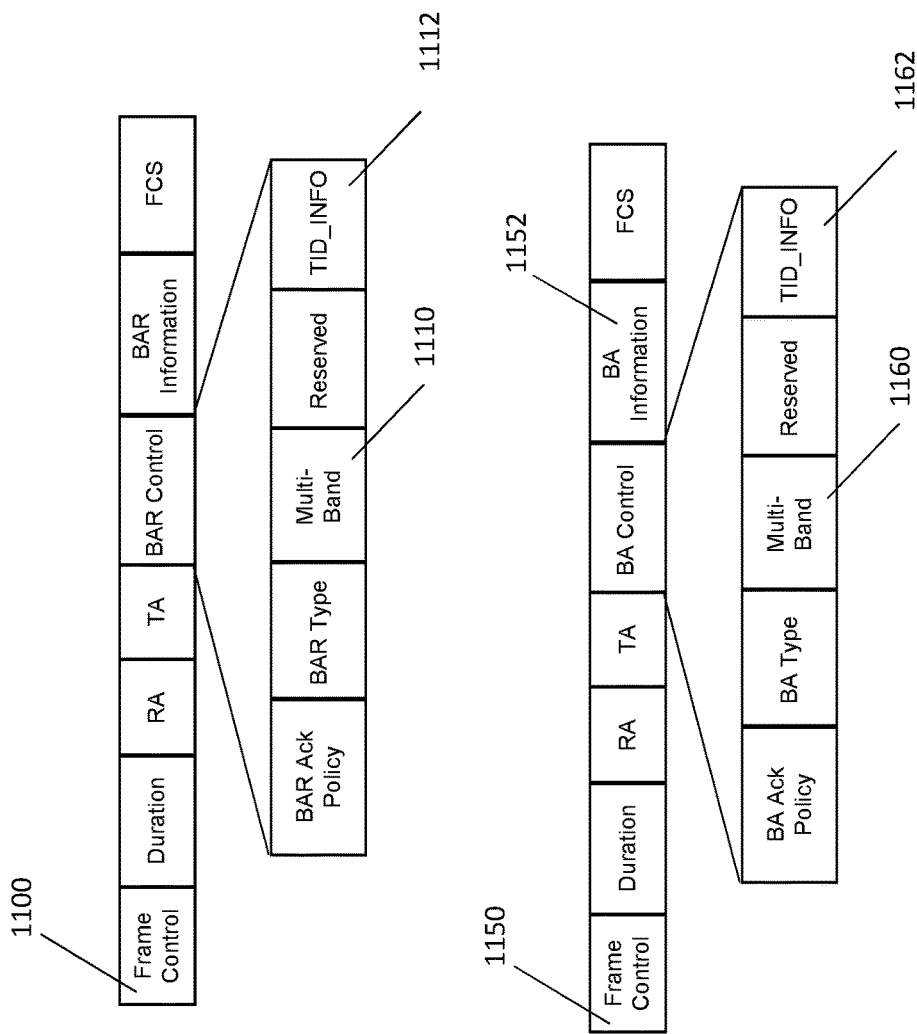
FIG. 11 depicts an illustration of a multi-link BlockAck-Req frame and a multi-link BlockAck frame in accordance with various embodiments.

FIG. 11 depicts an illustration of a multi-link BlockAck-Req frame 1100 and a multi-link BlockAck frame 1150 in accordance with various embodiments. Upon completion of the multi-link transmission 530, the multi-link originator 302 may transmit a multi-band BlockAckReq frame 1100 to the multi-link recipient 304 on any of the links (e.g., on the primary link) to solicit a multi-link BlockAck frame 1150. The multi-link BlockAck frame 1150 includes a consolidated BA bitmap in a BA information field 1152, acknowledging the frames received on the three links. A multi-band field 1110 and a multi-band field 1160 differentiate the multi-link BlockAckReq frame 1100 and the multi-link BlockAck frame 1150 from a prior art single link BlockAckReq frame and a prior art single link BlockAck frame, respectively.

The consolidated BA bitmap in the multi-link BlockAck frame 1150 indicates that the Recipient failed to receive the QoS Data A-MPDU 536c transmitted on the 2.4 GHz band. In order to improve the success rate of retransmission by using frequency diversity, the multi-link originator 302 may choose to retransmit the QoS Data A-MPDU 538 on the 6 GHz band instead of the 2.4 GHz band used for the original transmission.

The multi-link originator 302 subsequently transmits the multi-link BlockAckReq frame 1100 to the multi-link recipient 304 on a different link (e.g., on the primary link) to solicit the multi-link BlockAck frame 1150 which carries the consolidated BA bitmap acknowledging the frames received on the 6 GHz band.

The Receiver Address (RA) and the Transmitter Address (TA) fields are set as the MAC address of the wireless radio interface of each link. However, regardless of the content of the RA and TA fields, if the Multi-band field 1110 is set to "1", the BlockAckReq frame 1100 is interpreted as soliciting a multi-link BlockAck frame acknowledging the frames belong to the TID indicated in a TID_INFO field 1112 regardless of the link on which the frames are received.

Similarly, regardless of the content of the RA and TA fields, if the Multi-band fields 1160 is set to "1", the multi-link BlockAck frame 1150 carries a consolidated BA bitmap in the BA Information field 1152 acknowledging the frames belong to the TID indicated in the TID_INFO field 1162 regardless of the link on which the frames are received.

Thus, in accordance with present embodiments, traffic belonging to a same TID may be split over multiple bands. In addition, Block Acks for multiple bands may be consolidated and transmitted on another band. This capability is provided in accordance with present embodiments for the existing Block Ack Request types such as Compressed, Multi-TID, Multi-STA, and GroupCast with Retries (GCR) Block Ack Request types.

Figure 12A:
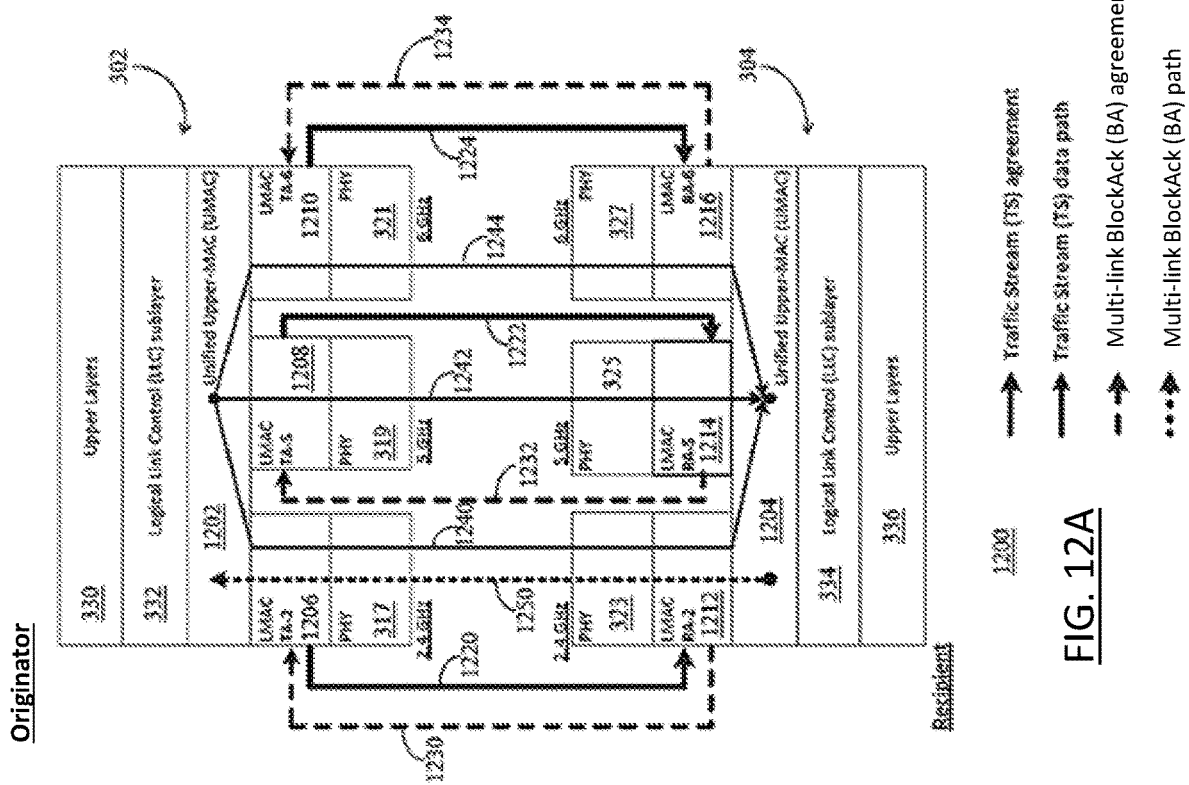
FIG. 12A depicts an illustration of a Traffic Stream and Block Ack architecture in accordance with various embodiments.

FIG. 12A depicts an illustration 1200 of a Traffic Stream and Block Ack architecture in accordance with various embodiments. The MAC layers 318, 320, 322, 324, 326, 328 are split into band-agnostic unified Upper MAC (UMAC) layers 1202, 1204 and band specific Lower MAC (LMAC) layers 1206, 1208, 1210, 1212, 1214, 1216. In this architecture, the LMAC/PHY layers of different links are tightly coupled together with the UMAC coordinating the operations of each link specific LMCAC/PHY layers. Such architecture may be appropriate when an MLD is implemented as a single piece of silicon hardware. The Multi-link Traffic Stream agreements 1220, 1222, 1224 and the Multi-link Block Ack agreements 1230, 1232, 1234 for a TID are setup between the respective MAC layers of each link.

The Upper Layers 330, 336 and the LLC layers 332, 334 only need to deal with the unified UMAC layers 1202 and 1204 respectively. At the transmitter 302 side, the unified UMAC layer 1202 performs multi-link aggregation of the TS data (i.e., frames belonging to a particular Traffic Stream (TS) may be aggregated over different links) over three TS data paths 1240, 1242, 1244 and makes the decision of which link(s) to use for transmissions as well as re-transmissions. The actual link used for the transmissions may be transparent to the upper layers. The multi-link recipient 304 unified UMAC 1204 is responsible for multi-link de-aggregation (i.e., reordering of frames belonging to a particular Traffic Stream (TS) received from different links) and recording the reception in a consolidate Block Ack Scoreboard.

The multi-link recipient 304 unified UMAC 1204 is also responsible for Multi-link Block Ack generation and transmission of the Multi-link Block Ack (BA) along a Multi-link BA path 1250 on a selected link (in this example, 2.4 GHz). The multi-link originator 302 may solicit Multi-link BA on any link by transmitting a Multi-link Block Ack Request. The recipient 304 generates and transmits the Multi-link Block Ack in response to reception of a Multi-link Block Ack Request frame or upon an implicit request to generate a multi-link BlockAck frame. The multi-link BlockAck frame is transmitted on the same link on which the respective request was received.

Figure 12B:
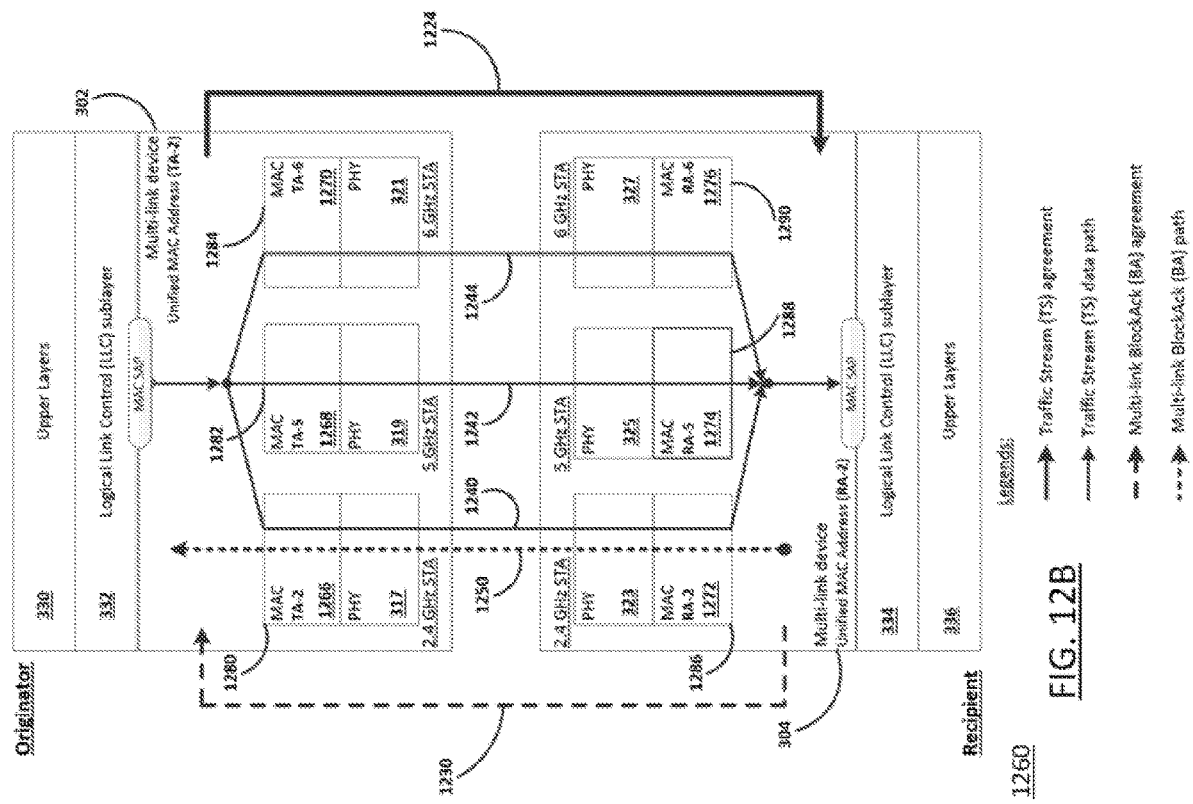
FIG. 12B depicts an illustration of a Traffic Stream and Block Ack architecture purpose defined to take care of Multi-link transmission and Multi-link Block Ack in accordance with various embodiments.

FIG. 12B depicts an illustration 1260 of a Traffic Stream and Block Ack architecture purpose defined to take care of Multi-link transmission and Multi-link Block Ack in accordance with present embodiments. In this architecture, an MLD may be viewed as a collection of one or more affiliated STAs, each STA operating on one link at a time. All affiliated STAs may share a common MAC Service Access Point (SAP) to the upper layers and a unique MAC Address may be assigned to represent the MLD. Each affiliated STA has its own MAC/PHY layers and each MAC layer may have a unique MAC address assigned to it. The MAC address of the MLD may be same as one of the affiliated STA's MAC address, or they may be different. The MLD coordinates the operations of each link specific affiliated STA. For example, the originator MLD 302 has three affiliated STAs 1280, 1282 and 1284 that operate on the 2.4 GHz link, the 5 GHz link and the 6 GHz link respectively. Similarly the recipient MLD 304 has three affiliated STAs 1286, 1288 and 1290 that operate on the 2.4 GHz link, the 5 GHz link and the 6 GHz link respectively. The STA 1280 has its own MAC layer 1266 with the MAC address TA-2 and PHY layer 317, the STA 1282 has its own MAC layer 1268 with the MAC address TA-5 and PHY layer 319, the STA 1284 has its own MAC layer 1270 with the MAC address TA-6 and PHY layer 321, the STA 1286 has its own MAC layer 1272 with the MAC address RA-2 and PHY layer 323, the STA 1288 has its own MAC layer 1274 with the MAC address RA-5 and PHY layer 325, and the STA 1290 has its own MAC layer 1276 with the MAC address RA-6 and PHY layer 327. The MAC address of MLD 302 may be the same as that of STA 1280 i.e. TA-2, while the MAC address of MLD 304 may be the same as that of STA 1286 i.e. RA-2. This architecture may be appropriate when each affiliated STA is implemented as an independent silicon, plurality of which may be housed together in a module to form an MLD, in which case the MLD may be seen as a logical collection of STAs. Of course, it is also possible that with the advance of the silicon technology, the entire MLD is implemented as a single piece of silicon hardware. It will be appreciated that a variety of architectures for MLDs are possible. In this example, the Multi-link Traffic Stream 1224 and Multi-link Block Ack agreement 1230 for a TID are setup between the respective MLDs 302 and 304 and are link-agnostic and hence much simpler to manage. The Multi-link Traffic Stream 1224 and Multi-link Block Ack agreements 1230 may be identified by the TID and the MAC addresses of the MLDs and not by the link specific MAC addresses.

At the originator MLD 302, the MLD receives TS data from upper layer through the common MAC SAP and performs multi-link aggregation of the TS data over three TS data paths 1240, 1242, 1244 and makes the decision of which link(s) to use for transmissions as well as re-transmissions and passes the TS data to the respective STA for transmission on the link. Similarly the recipient MLD 304 is responsible for multi-link de-aggregation of the TS data received from each of the affiliated STAs (and also for reordering the frames belonging to the TS received on the three TS data paths 1240, 1242, 1244) before passing the TS to the upper layers via the shared MAC SAP.

Figure 13:
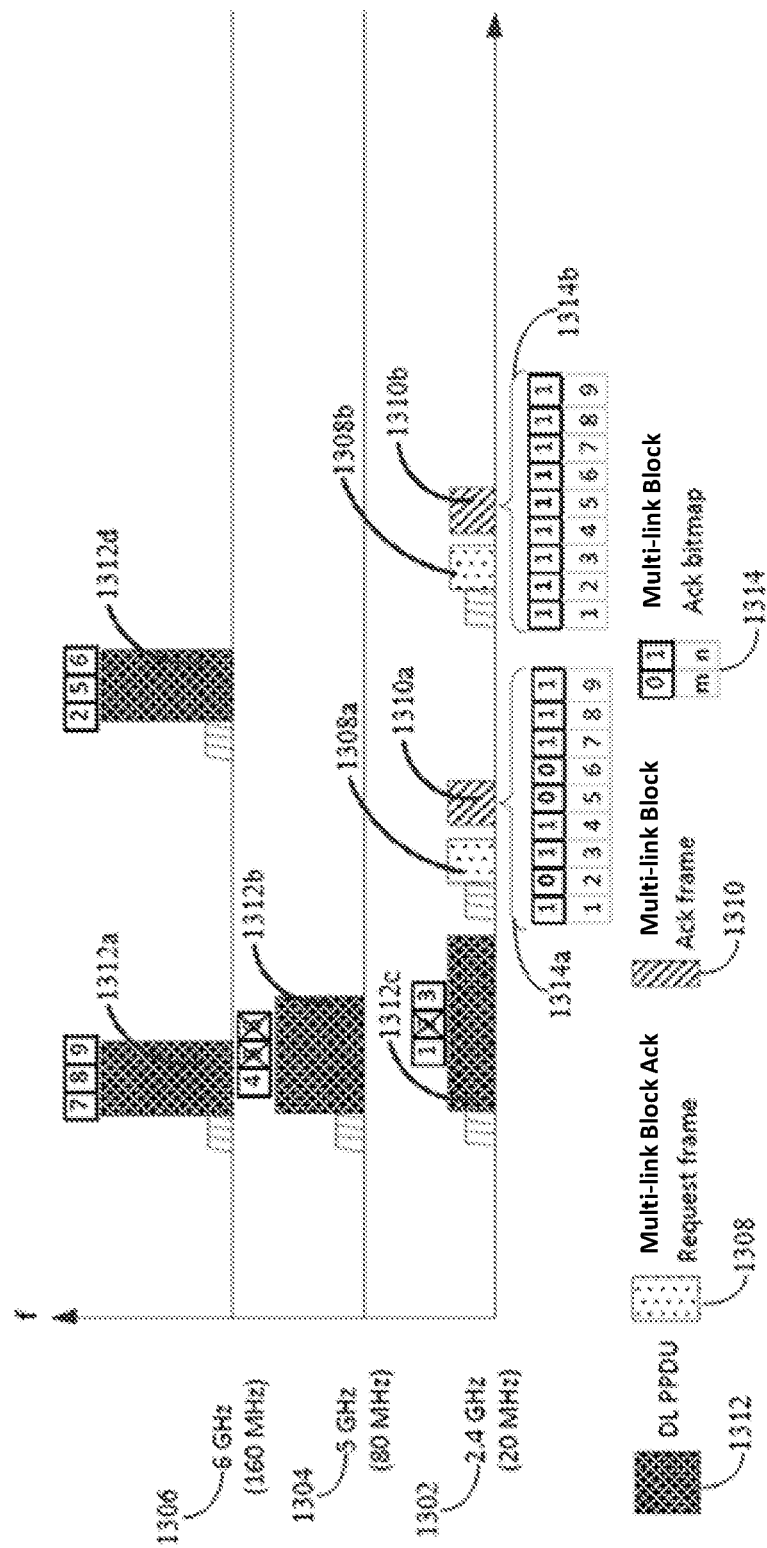
FIG. 13 depicts an illustration of an exemplary multi-link transmission in accordance with various embodiments.

FIG. 13 depicts an illustration 1300 of an exemplary multi-link transmission in accordance with various embodiments showing transmissions on a first link 1302 in a first frequency band (e.g. 2.4 GHz), a second link 1304 in a second frequency band (e.g. 5 GHz) and a third link 1306 in a third frequency band 1306 (e.g. 6 GHz) and assumes that the TS and BA setup for a TID has been completed on the concerned links. The bandwidth of the channels on each link 1302, 1304, 1306 may vary depending on channel conditions and availability (e.g. 20 MHz on the 2.4 GHz band 1302, 80 MHz on the 5 GHz band 1304 and 160 MHz on the 6 GHz band 1306). In some deployments Link One 1302 (e.g., the 2.4 GHz band) may be primarily used to exchange management and control frames such as the Multi-link Block Ack Request frames 1308 and the Multi-link Block-Ack frames 1310 and may be known as a Primary link, while Link Two 1304 (e.g., the 5 GHz band) and Link Three 1306 (e.g., the 6 GHz band) may be primarily used to exchange Data frames 1312 (e.g., downlink (DL) PPDUs) and may be known as secondary links or supplementary links. Whereas in other deployments, there may not be any restrictions on the types of frames that may be transmitted on any links and there may not be such primary/secondary link distinctions.

After gaining access to the channel on each link, the AP 102 initiates the multi-link transmission 1300 which is made up of downlink PPDU 1312*a* on Link Three 1306, downlink PPDU 1312*b* on Link Two 1304 and downlink PPDU 1312*c* on Link One 1302. Each PPDU may carry aggregated MPDUs (A-MPDU), each with a number of frames.

The AP 102 sets the Ack policy in a QoS Control field of each frame to Block Ack to indicate that there should be no immediate ack in each link and assigns the transmission of the BAR and BA on a low rate link (e.g., the 2.4 GHz band 1302) to free up the high rate links (e.g., Link 2 1304 and Link 3 1306) for data transmissions. In addition, the same sequence number counter is used for each non-AP MCD, TID pair across multiple links to ensure that the Sequence Number (SN) of transmitted frames do not repeat across links. In this example frames with SN 1, 2 and 3 are transmitted in the PPDU 1312*c* on Link One 1302, frames with SN 4, 5 and 6 are transmitted in the PPDU 1312*b* on Link Two 1304 and frames with SN 7, 8 and 9 are transmitted in the PPDU 1312*a* on Link Three 1306. The STA 104 (i.e., the Recipient) maintains a separate BlockAck Bitmap for each link at a Network Interface (NIC), but consolidates it into a single BlockAck Bitmap 1314 upon receiving a Multi-link BlockAckReq frame. The Multi-link BA frames 1310 carry the consolidated bitmaps 1314 acknowledging the frames received on the three links—a bit set to "1" indicates successful frame reception of the frame with SN corresponding to that bit and a "0" indicates failed frame reception of the frame with SN corresponding to that bit.

In the exemplary transmission 1300, the multi-link aggregated DL PPDU frame transmission comprises frame 1312*a* transmitted on Link Three 1306, frame 1312*b* transmitted on Link Two 1304 and frame 1312*c* on Link One 1302 and transmission of frame with SN 2 on Link One 1302 and frames with SN 5 and 6 on Link Two 1304 fails. Upon completion of the multi-link transmission, the AP 102 transmits the Multi-link BlockAckReq frame 1308*a* to solicit a Multi-link BA acknowledging the frame transmitted on the three links 1302, 1304, 1306. The Multi-link BA 1310*a* consolidates the BlockAck bitmaps from the three links into the consolidated BlockAck bitmap 1314*a*. Bits 2, 5 and 6 corresponding to SN 2, 5 and 6 are set to "0" in the consolidated BlockAck bitmap 1314*a* indicating the failed reception of frames with SN 2, 5 and 6 while the rest of the bits are set to 1 to indicate successful reception. Since there were failed transmissions on Link Two 1304 and Link One 1302 but not on Link Three 1306, the AP 102 may decide that channel conditions on Link Three are better and choose to consolidate the failed frames and re-transmit them on Link Three 1306 in PPDU 1312*d*. Subsequently, the Multi-Link BlockAckReq frame 1308*b* is transmitted on Link One 1302 to solicit the Multi-Link BA 1310*b* carrying acknowledgements for the frames carried in the PPDU 1312*d* transmitted on Link Three 1306. This time all three re-transmitted frames are successfully received and the STA 104 transmits the Multi-link BA 1310*b* with the corresponding bits in the BA bitmap set to 1.

Figure 14:
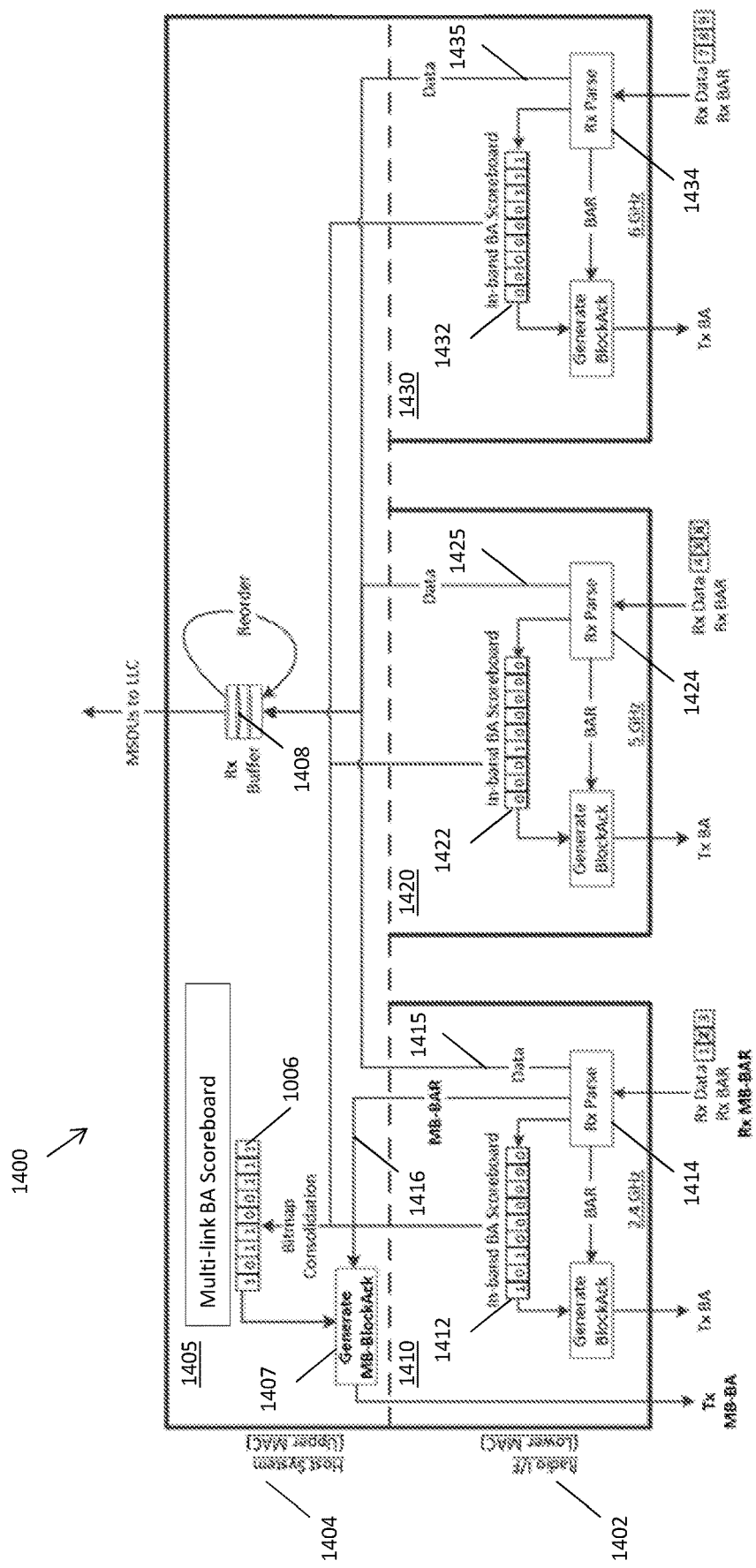
FIG. 14 depicts an illustration of an exemplary reference model for Multi-link Block Ack implementation in accordance with various embodiments.

FIG. 14 depicts an illustration 1400 of an exemplary reference model for Multi-link Block Ack implementation in accordance with various embodiments. In a wireless communication device, the Radio Interface (I/F), the PHY layers and time critical MAC functions of each link may be implemented as independent module and may be considered part of an independent affiliated STA (e.g., 1410, 1420, 1430 for the 2.4 GHz band, the 5 GHz band and 6 GHz band, respectively, such as the transceivers 230, 232, 234 (FIG. 2)). All of the modules/STAs 1410, 1420, 1430 are all connected to a host system 1405 which may be a CPU. The Physical Layer (PHY) modules (e.g., 323, 325, 327 (FIG. 12A, FIG. 12B)) as well as time critical MAC functions in the lower MAC layers 1402 (e.g., 1212, 1214, 1216 (FIG. 12A) and 1272, 1274, 1276 (FIG. 12B)) may be implemented on the Radio I/Fs 216, 218, 220 each of which may be part of independent affiliated STAs (e.g. 1286, 1288, 1290 in FIG. 12B), while the rest of the MAC functions (i.e., the upper MAC layer 1404 (e.g., 1202 (FIG. 12A)) may be implemented in the host system 1405. The whole system 1400 may constitute an MLD.

Due to the low latency required to produce a BA in response to a BAR (within the Short Interframe Space (SIFS) from the end of the BAR), the Block Ack Scoreboard for a particular band is implemented using fast but expensive on-chip memory in each radio I/F. However, maintaining the BA Scoreboard that persists for an entire duration of all active Block Ack sessions (known as a full state Block Ack) increases the memory requirement burden for a receiver implementation. Hence, most implementations reuse the on-chip memory for more than one Block Ack session, with the memory serving as a cache for storing the state of the most recently active Block Ack session (which is referred to as a partial state Block Ack). The In-band BA Scoreboard 1412, 1422, 1432 are examples of on-chip memories used as BA scoreboards to record the reception status of frames received on the 2.4 GHz, 5 GHz and 6 GHz bands, respectively. The In-band BA Scoreboards may also be known as per-link BA Scoreboard or per-link Scoreboard in short. Partial state Block Ack saves memory but increases the risk that the Block Ack Scoreboard may be overwritten by another Block Ack session in a next Transmission Opportunity (TXOP) and hence requires special handling to prevent loss of data.

To realize multi-link Block Ack operation, a Multi-link BA Scoreboard 1406 is maintained in the host system 1405. Since memory on the host system 1405 is generally cheaper, the Multi-link BA Scoreboard 1406 may be implemented as a full state Block Ack Scoreboard, i.e., the Scoreboard persists for the entire duration of a Multi-link Block Ack session.

In accordance with the present embodiments and as shown in the illustration 1400, the frames received in each link are parsed by the Rx Parsers 1414, 1424, 1434 and handled according to the frame type. Data frames 1415, 1425, 1435 that are correctly received and addressed to the recipient are recorded according to their sequence number (SN) in the In-band BA Scoreboard 1412, 1422, 1432 before being passed up to the Receive Buffer 1408. The content of the Receive Buffer 1408 may be re-ordered according to the data frame SN at regular intervals.

In conventional single link Block Ack operation, upon the completion of the TXOP (for implicit Block Ack) or upon receiving a legacy BlockAck Request (BAR) frame (for explicit Block Ack), the lower MAC copies the BA bitmap from the In-band BA Scoreboard and generates the Block-Ack frame for immediate transmission. However, for Multi-link Block Ack operation, explicit Block Ack may be used and upon completion of the TXOP on each band, the multi-link BA Scoreboard 1406 is updated with the content of the In-band Scoreboard 1412, 1422, 1432 from the respective radio I/F. By the end of a multi-link transmission opportunity (TXOP), the multi-link BA Scoreboard 1406 would have consolidated the BA bitmaps of all the In-band BA Scoreboards 1412, 1422, 1432.

Finally, upon receiving the multi-link BAR frame 1416 on any of the links, the upper MAC 1404 copies the BA bitmap from the multi-link BA Scoreboard 1406 and generates 1407 the multi-link BlockAck frame for transmission. At the same time, the reception of the multi-link BAR frame 1416 also triggers the upper MAC to reassemble the complete MSDUs from the frames in the Receive Buffer 1408 (all complete MSDUs with SN lower than the Starting Sequence Number (SSN) carried in the multi-link BAR frame 1416) and forward them in order to the upper layers. Although in the illustration 1400, the reception of the multi-link BAR frame 1416 and the transmission of the multi-link BA frame 1820 are shown in the 2.4 GHz band, it is to be understood that the process is the same for other frequency bands as well.

In accordance with FIGS. 1-14, a single block ack agreement may be negotiated between two MLDs for a TID that may be transmitted over one or more links. The block ack agreement may be represented by the tuple of { an Originator MLD MAC address, a Recipient MLD MAC address and a TID}. Further, a multi-link block ack agreement may be negotiated by exchanging a single pair of ADDBA Request/Response frames over any one of the enabled links between two MLDs. Even further, sequence numbers may be assigned from a common sequence number space shared across multiple links of a MLD, for MSDUs of a TID that may be transmitted to a peer MLD over one or more links.

However, potential issues may arise during multi-link transmissions when frames of the same TID are transmitted over different links at the same time, such as when one or more of the per-link Scoreboard contexts at the recipient MLD gets out of range. Referring to FIG. 15A, an originator MLD may transmit MPDUs with SNs 1-15 on a Link-1 (as shown in Link-1 Transmit window 1502) and MPDUs with SNs 16-30 on a Link-2 (as shown in Link-2 Transmit window 1504) to a recipient MLD. The SN in Link-1 Transmit window is controlled by the Link-1 Transmit Control that starts at WS_O=1 (i.e. WS_O refers to the start of the Transmit window WinStart$_O$) and ends at 15 (assuming a Transmit window size of 15 was negotiated during the Multi-link BA agreement for both links), while the SN in Link-2 Transmit window starts at WS_O=16 and ends at 30. Due to, for example, poor quality of Link 1 transmission, the recipient MLD may fail to receive MPDUs with SNs 3 and 5 to 15. This can be seen in Link-1 scoreboard 1512 where SNs 3 and 5 to 15 have a zero value. On the other hand, Link-2 Scoreboard 1514 indicates that all the MPDUs with SN 16 to 30 are successfully received by the recipient MLD. At this time the Link-2 scoreboard has shifted to the right (from initial WS_R=0) and now starts at WS_R=16 and ends at WE_R=30. (i.e. WS_R and WS_E refers to the starting SN WinStart$_R$ and ending SN WinEnd$_R$ of the Scoreboard context respectively). These MPDUs are consolidated in a re-order buffer 1516 where the MPDUs with the smallest value of consecutively running SNs i.e. SNs 1 and 2 are then forwarded to the next MAC process. However, the MPDUs with SNs 4 onwards that are successfully received by the recipient MLD cannot be forwarded to the next MAC process because MPDU with SN 3 has not been correctly received i.e. the forwarding has to be in sequential order. As a result, the SN of the frames in the re-order buffer 1516 now begins from 3 (i.e. WS_B=3; WS_B refers to the start of the receive reorder buffer WinStart$_R$)), with a gap at SN=3 and 5 to 15 as these MPDUs are not received by the recipient MLD.

Referring to FIG. 15B, the Originator MLD may receive per-link BlockAck frames in each link, or a Multi-link BlockAck frame in one of the links and come to know of the transmission status of the MPDUs. As a next step, the failed MPDUs on Link 1 may be re-transmitted on Link 2 to the recipient MLD to take advantage of the better link. However, since the Scoreboard context on Link 2 has already shifted to the right and therefore out of range of the re-transmitted smaller SNs, the MPDUs with smaller SNs re-transmitted on Link 2 will be discarded, even though they were all received in good order. This is in accordance with IEEE 802.11REVmd_D3.0, 10.25.6.3—Scoreboard context control during full-state operation i.e. If WinStart$_R$+$2^{11}$≤SN<WinStart$_R$, make no changes to the Scoreboard record. Here SN refers to the SN of the received frame and WinStart$_R$ refers to the starting SN of the Scoreboard context. The above is just one example to illustrate the potential issue of Scoreboard contexts of different links going out of each other's range, risking the failure of MPDUs re-transmitted on another link. As can be appreciated, the problem will get worse if the different links have different bandwidths, and consequently different Scoreboard context sizes. The Scoreboard context of the links with higher bandwidth can be expected to be shifted to the right much faster compared to the links with lower bandwidth, increase the risk of the Scoreboard contexts of different links going out of each other's range.

Figure 15C:
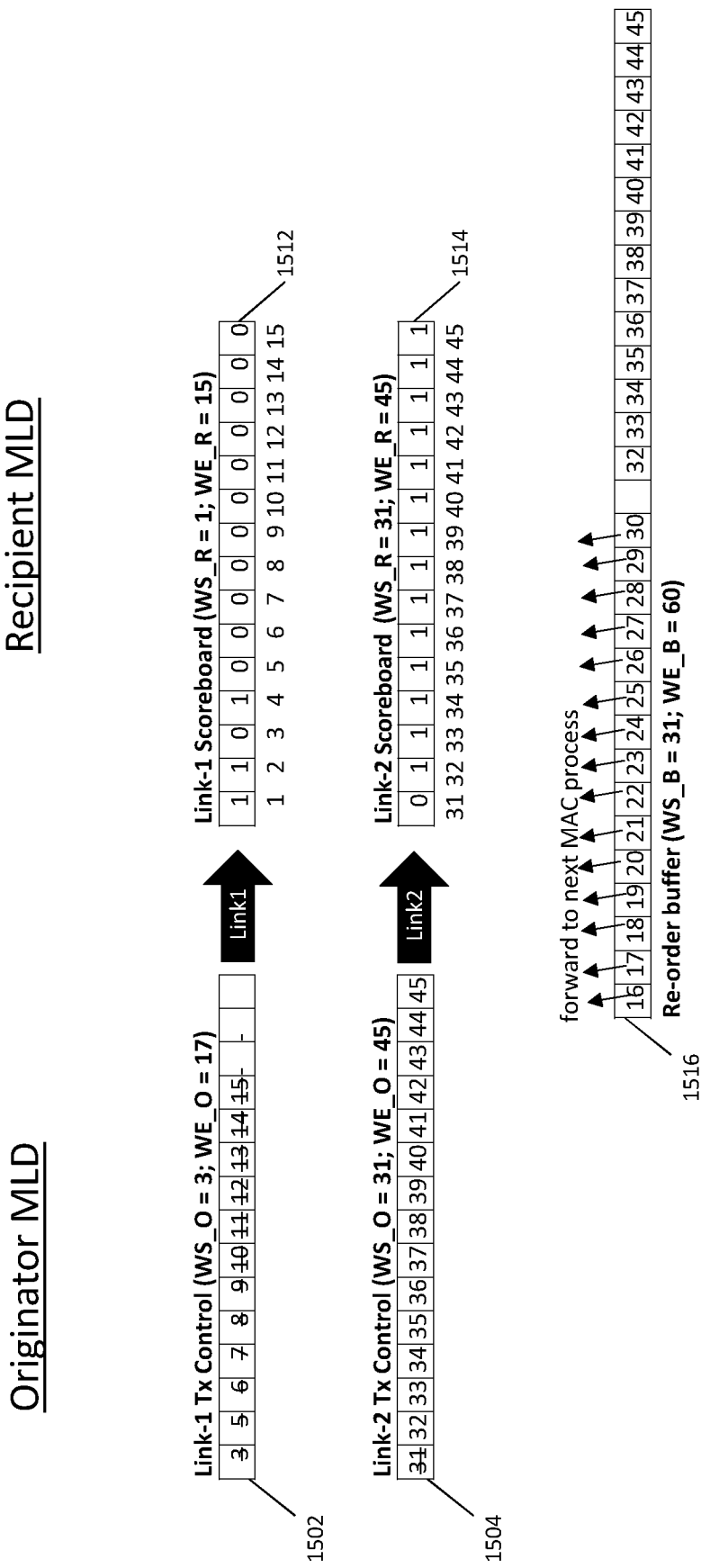

Alternatively, a receive reordering buffer overflow issue may also occur. Referring to FIG. 15C, the MPDUs with SNs 3 and 5 to 15 that previously failed on be transmitted on Link 1 may be retransmitted on Link 1 to the recipient MLD. Further, following the successful transmission of MPDUs with SNs 16 to 30 as shown in FIG. 15A, new MPDUs with SNs 31 to 45 may be transmitted on Link 2 to the recipient MLD. However, the MPDUs with SNs 3 and 5 to 15 may again fail to be received on Link 1 and MPDU with SN 31 may fail to be received on Link 2. As a result, the re-order buffer now has MPDUs with SNs starting from 16 up to 45 with a gap at SN=31. Here, we assume the size of the receive reorder buffer WinSize$_B$=30 (sum of buffer sizes of link-1 and link-2). As per the rules for the operation of receive reorder buffer, upon receiving a MPDU with SN greater than the end of the receive buffer, the end of the receiver reorder buffer is shifted to accommodate the new MPDU (i.e. WS_R=16 and WE_B=45; WE_B refers to the end of the receive reorder buffer WinStart$_B$)), and the contents of the buffer with SN less than the new start of the buffer WS_R (e.g. MPDU with SN 4) are passed up to the next MAC process when if gaps exist in the SNs of the MPDUs. Further, MPDUs with SNs 16 to 30 previously received on Link 2 are forwarded to the next MAC process but MPDUs with SN 31 and above cannot be forwarded due to the gap caused by the transmission failure of MPDU with SN 31 (i.e. WS_R=31 and WE_B=60).

Figure 15D:
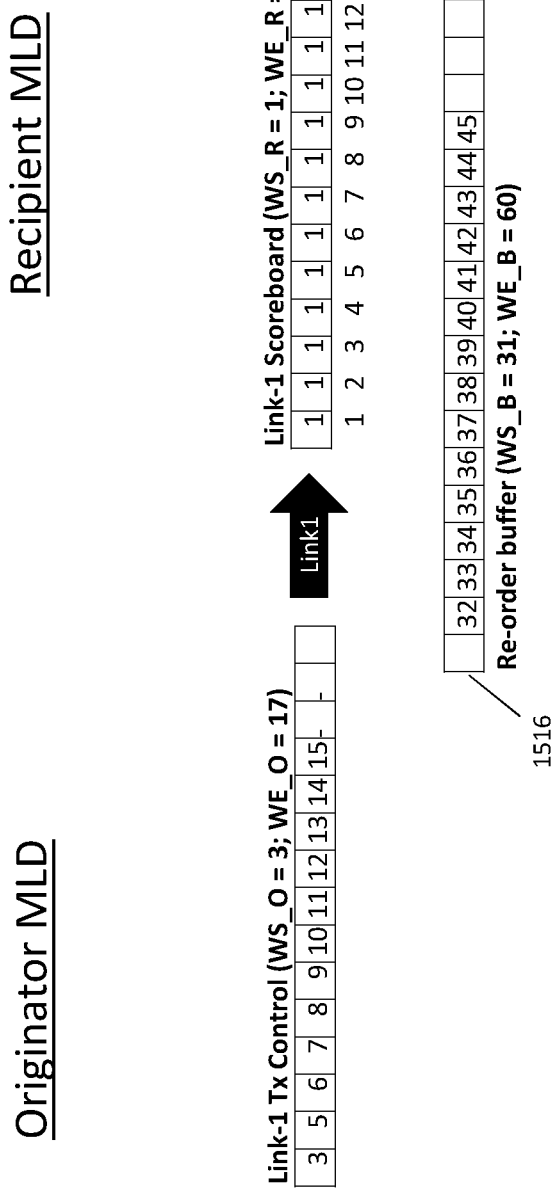

Referring to FIG. 15D, the failed MPDUs with SNs 3 and 5 to 15 on Link 1 are once again re-transmitted on Link 1 to the recipient MLD. This time, all these MPDUs are successfully received and their receipt are recorded on the Link-1 scoreboard. However, even though the re-transmitted MPDUs are correctly received on Link 1, they cannot be recorded in the receive reordering buffer and will be discarded at the recipient MLD, because the receive reordering buffer 1516 has already shifted to the right. This issue will be more common when there is a big difference in bandwidth/throughput among links i.e. the faster link will dominate the receive reordering buffer. As MPDUs with higher SN (beyond the current value of WinEnd$_B$) are received over the faster links, the receive reorder buffer will shift to the right (i.e. value of $WinStart_B$ and $WinEnd_B$ will get higher) and thereby increasing the risk of overflowing receiver reordering buffer.

Figure 16:
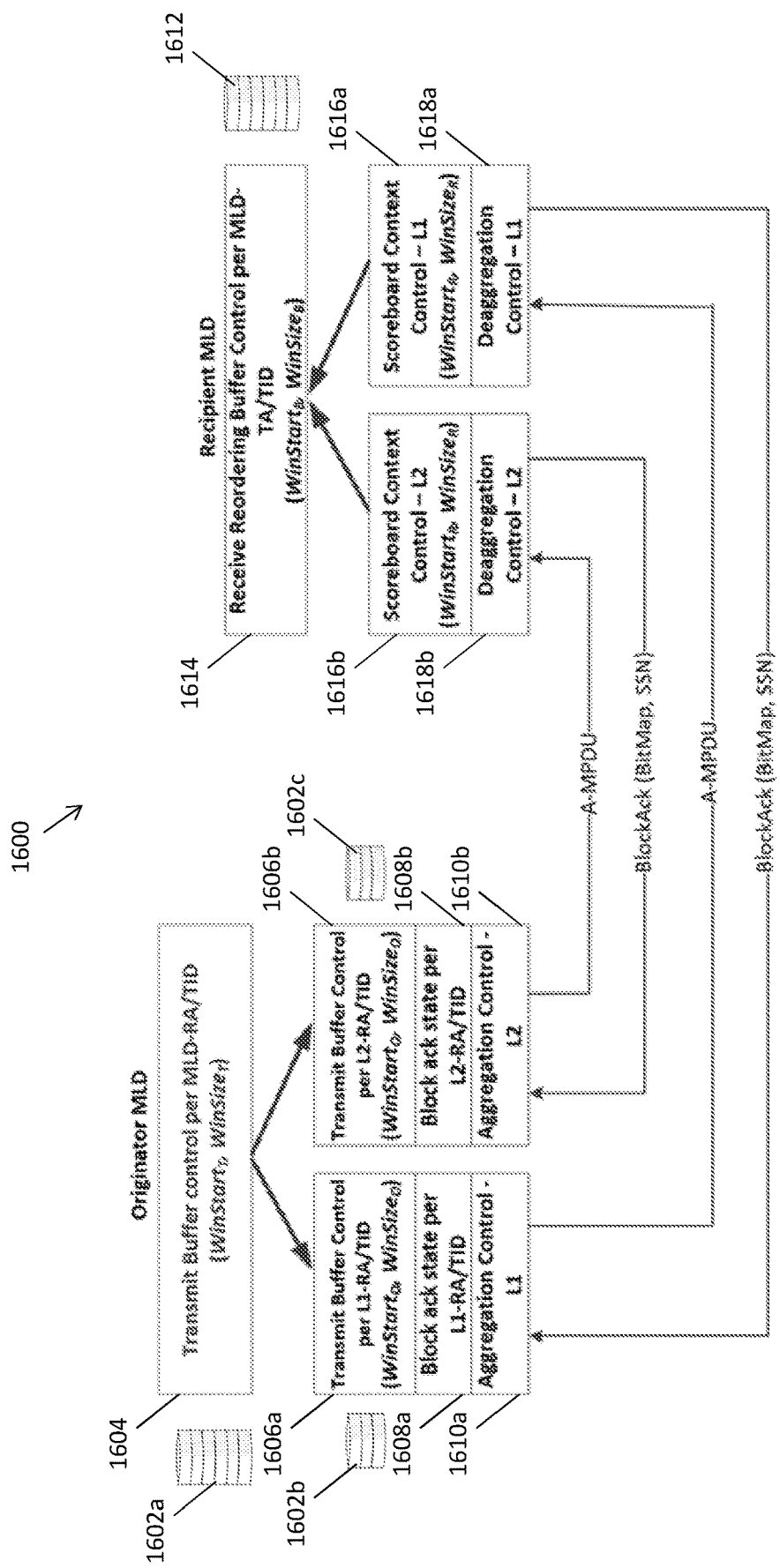
FIG. 16 depicts an illustration of a multi-link Block Ack architecture 1600 in accordance with present embodiments.

In order to solve the above issues, a two-tiered block ack architecture is proposed for multi-link transmissions as shown in FIG. 16. Essentially, originator MLD comprises a transmit buffer control per MLD-RA/TID 1604 with a starting SN equal to $WinStart_T$ and of size $WinSize_T$ for a common Transmit buffer 1602a shared among all links (or all affiliated STA assuming one affiliated STA per link if MLD architecture in FIG. 12B is followed) that enables flexible re-transmissions across links and also prevents receive reordering buffer overruns at the recipient MLD. On the other hand, recipient MLD comprises a receive reordering buffer control per MLD-TA/TID 1614 with a starting SN equal to $WinStart_T$ and of size $WinSize_T$ for a common receive reordering buffer 1612 to ensure the MPDUs are forwarded in correct SN to a next MAC process. Here MLD-RA and MLD-TA refers to the MAC address of the Recipient MLD and the Originator MLD respectively. In order words the originator MLD maintains a Transmit Buffer and a Transmit Buffer Control for every TID of a Multi-link Block Ack agreement. The originator MLD also comprises transmit buffer control per L1-RA/TID 1606a with a starting SN $WinStart_O$ and of size $WinSize_O$, a transmit buffer 1602a, block ack state per L1-RA/TID 1608a and aggregation control L1 1610a for a Link 1, as well as transmit buffer control per L2-RA/TID 1606b with a starting SN $WinStart_O$ and of size $WinSize_O$, a transmit buffer 1602c, block ack state per L2-RA/TID 1608b and aggregation control L2 1610b for a Link 2. Here L1-RA and L2-RA refers to the MAC address of the affiliated STAs of the Recipient MLD operating on Link-1 and Link-2 respectively. In order words each affiliated STA of the originator MLD also maintains a per-link Transmit Buffer Control for every TID of a Multi-link Block Ack agreement, if that link is part of the Multi-link Block Ack agreement. Each affiliated STA of the originator MLD may also maintain a per-link Transmit Buffer for every TID of a Multi-link Block Ack agreement, if that link is part of the Multi-link Block Ack agreement. Advantageously, the per-link transmit buffer control 1606a and 1606b prevents overflow of a block acknowledgment record (Scoreboard context) maintained by each STA or station affiliated with the recipient MLD, that may be caused due to transmission of the frames over one or more links as illustrated in FIG. 15A to 15D. Advantageously, the common Transmit Buffer shared among all links enables flexible re-transmissions across links and also prevents Receive Reordering Buffer overruns at Recipient. However, having the same MPDU stored in two different Transmit Buffers require additional rules to ensure the two Transmit Buffers stay in synchronization. E.g. an MPDU already being transmitted on one link shouldn't be transmitted on another link prior to receiving transmit status on the original link. Only upon receiving feedback of a transmission failure on one link, an MPDU should be re-transmitted on another link, and the MPDU should be deleted from the per-link Transmit Buffer of the link of the original transmission. Upon receiving feedback of successful transmission over any link, or upon expiry of the MSDU Lifetime of the MSDU carried in the MPDU, the MPDU should be deleted from both the per-link Transmit Buffer as well as the common Transmit Buffer. The size of the block acknowledgement record for each STA or station is negotiated independently during the Multi-link Block ack negotiation as will be explained later. It will be appreciated that the STAs affiliated with the originator MLD or recipient MLD may also be termed as stations. The block ack states are used by the originator MLD to keep track of the status of the transmitted MPDUs and are updated upon receiving Block Ack frames from the recipient MLD. The role of the Aggregation Control is to construct A-MPDUs for transmission by aggregating two or more MPDUs.

On the other hand, the recipient MLD further comprises a scoreboard context control L1 with a starting SN $WinStart_R$ and of size $WinSize_R$ 1616a and a deaggregation control L1 1618a for Link 1, as well as a scoreboard context control L2 with a starting SN $WinStart_R$ and of size $WinSize_R$ 1616b and a deaggregation control L1 1618b for Link 2. Scoreboard context may also be known as block acknowledgment records and they keep a record of the reception status of MPDUs. The role of the deaggregation control is to de-construct a received A-MPDU into two or more MPDUs. The Recipient MLD also maintain a common receive reordering buffer (or receive buffer in short) for each TID of a Multi-link Block Ack agreement. The main role of the receiver reordering buffer is to ensure MPDUs are forwarded in the correct SN order to the next MAC process. Having a common receiver reordering buffer shared among affiliated STAs (links) ensures that the MPDUs received over different links are passed to the next MAC process in the correct order. It will be appreciated that the number of sets of transmit buffer control per RA/TID, block ack state per RA/TID, aggregation control, scoreboard context control and deaggregation control can be expanded to include 3 or more links. With this architecture, the originator MLD maintains a two-tier Transmit buffer control structure: a common transmit buffer control shared across multiple links, and a separate transmit buffer control for each link.

The Multi-link extension of the HT-immediate block ack mechanism may be known as Multi-link block ack and is negotiated separately for each direction between two MLDs for a particular TID. The MLD whose affiliated STAs send data using the Multi-link block ack agreement is referred to as originator MLD, and the MLD whose affiliated STAs are receiver of the data is referred to as recipient MLD. The Multi-link block ack agreement is uniquely identified by a tuple of {originator MLD MAC address, recipient MLD MAC address, TID}.

Under the architecture as shown in FIG. 16, the originator MLD contains a common transmit buffer control per {Recipient MLD MAC address, TID} that is shared among the affiliated STAs or stations that use the Multi-link block ack agreement, and uses $WinStart_T$ and $WinSize_T$ to submit MPDUs for transmission and release transmit buffers upon receiving BlockAck frames. $WinStart_T$ is the starting sequence number of the common transmit window across all links of the Multi-link block ack agreement and $WinSize_T$ is the size of the total Transmit window and is equal to the receive reordering buffer maintained by the recipient MLD. $WinSize_T$ is equal to the size of receive reorder buffer negotiated during block ack agreement. The size of receive reorder buffer may be negotiated independently or may be calculated based on the size of the per-link scoreboard contexts. The common transmit buffer is used as to store MSDUs or A-MSDUs until they are reported as successfully received or they exceed their lifetime (e.g. MSDU Lifetime).

Each affiliated STA of the originator MLD contains a per-link Transmit Buffer Control and a per-link block ack state per {peer affiliated STA MAC address, TID} and an Aggregation control. Each affiliated STA also maintains a per-link transmit buffer valid for a short period e.g. a single transmission opportunity (TXOP) and may be used for per-link retransmissions i.e. retransmission within the same TXOP.

The recipient MLD contains a common receive reordering buffer control per {Originator MLD MAC address, TID} and is responsible for recording and reordering the MSDUs/A-MSDUs arriving from each of the affiliated STAs, as well as identifying and discarding duplicate frames.

Further, each affiliated STA of the recipient MLD contains a per-link Scoreboard context control per {peer affiliated STA MAC address, TID} and a deaggregation control. Each per-link scoreboard context control contains an acknowledgement bitmap control containing the current reception status of MSDUs or A-MSDUs received over the associated link, and may use either full-state or partial-state operation.

In operation, the originator MLD may store transmitted frames in the common transmit buffer until they are acknowledged by the recipient MLD as successfully received or until they are discarded at the end of a MAC Service Data Unit (MSDU) lifetime. On the other hand, the stations affiliated with the originator MLD may store frames in the per-link transmit buffer only for the duration of a transmit opportunity (TXOP). In other words, frames are stored for a longer duration in the common transmit buffer compared to the per-link transmit buffer.

Figure 17A:
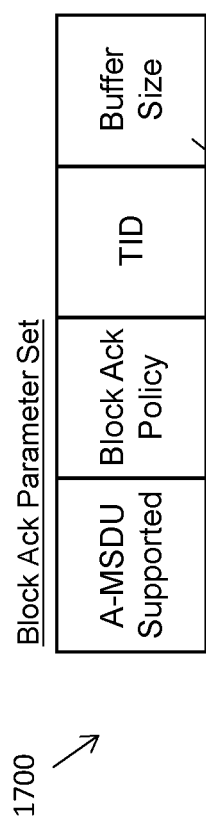
FIGS. 17A and 17B depicts an illustration of a multi-link Block Ack Parameter Set 1700 and Multi-band element 1710 for use with the Block Ack architecture 1600 in accordance with the present embodiments.
Figure 17B:
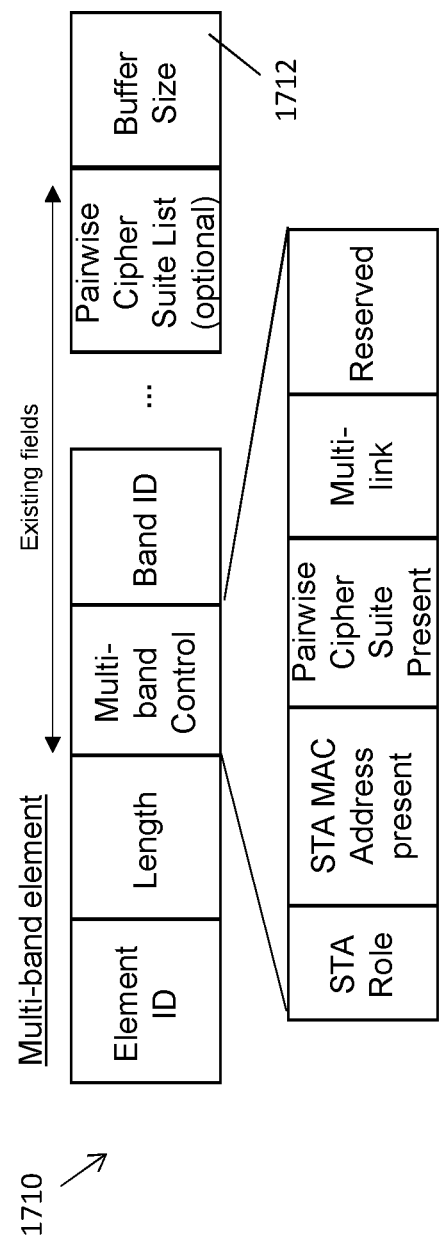

FIG. 17A shows a Block Ack Parameter Set (i.e. a field in ADDBA request frame 810 as shown in FIG. 8) and FIG. 17B shows a Multi-band element (i.e. a field in ADDBA response frame 820 as shown in FIG. 8) in accordance with the block ack architecture 1600 as illustrated in FIG. 16. Block Ack Parameter set 1700 includes a buffer size field 1702 which in the ADDBA response frame indicates the size of the Scoreboard context control (i.e. $WinSize_R$) of the link on which the ADDBA Response frame is transmitted. Multi-band element 1710 now includes a buffer size field 1712 which in the ADDBA response frame indicates the size of the Scoreboard context control ($WinSize_R$) of the link represented by the Multi-band element 1710. In accordance with the architecture as illustrated in FIG. 16, the size of the receive reordering buffer $WinSize_B=WinSize_T=$sum of $WinSize_R$ across all links of the multi-link block ack agreement. Alternatively, buffer size field 1702 in the ADDBA response frame may represent $WinSize_B$ and $WinSize_R$ of the link on which the ADDBA response frame was transmitted=$WinSize_B$–value of the buffer size field 1712 in Multi-band element (i.e. the $WinSize_R$ of the link on which the ADDBA response frame was transmitted is indirectly signalled).

Figure 18:
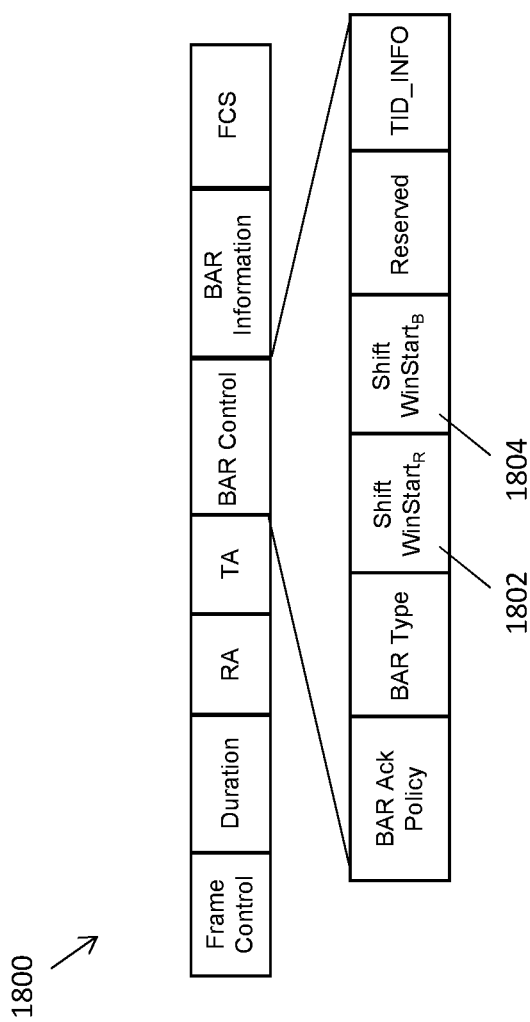
FIG. 18 depicts a format of an enhanced BlockAck Request (eBAR) frame 1800 for use with the multi-link Block Ack architecture 1600 in accordance with present embodiments.

FIG. 18 shows a format of an enhanced BlockAck Request (eBAR) frame in accordance with the architecture as illustrated in FIG. 16. As per existing HT-immediate block ack rules, a BAR frame may be used to shift forward the value of $WinStart_R$, but a BAR with Starting Sequence Number (SSN) value less than $WinStart_R$ is discarded, so it is not possible to shift back the value of $WinStart_R$. Therefore, enhanced BAR (eBAR) frame 1800 can explicitly allow this. For example, if the bit in Shift $WinStart_R$ field 1802 is set, recipient MLD shall replace the value of $WinStart_R$ of the Scoreboard Context (of the link on which the enhance BAR frame was received) with the value of the Starting Sequence Number (SSN) sub-field of the BAR information field. If the bit is not set, $WinStart_R$ is updated only if $WinStart_R<SSN \le WinStart_R+2^{11}$. Further, if the bit in Shift $WinStart_B$ field 1804 is set, recipient MLD shall replace the value of $WinStart_B$ with the value of the Starting Sequence Number sub-field of the BAR information field. If the bit is not set, recipient shall not update based on the value of SSN in BAR frames. Further, transmission of the eBAR frame 1800 on a link also replaces $WinStart_O$ of the link on the originator side with the value of SSN.

Alternatively, if a protected block ack agreement has been successfully negotiated, a robust ADDBA Request frame may also be used to achieve the same effect as the eBAR frame 1800. Accordingly, a BlockAck Request frame may be configured to indicate whether or not a starting point of a block acknowledgment record maintained by a station should be replaced with a value of a Starting Sequence Number (SSN) carried in the BlockAck Request frame.

Figure 19:
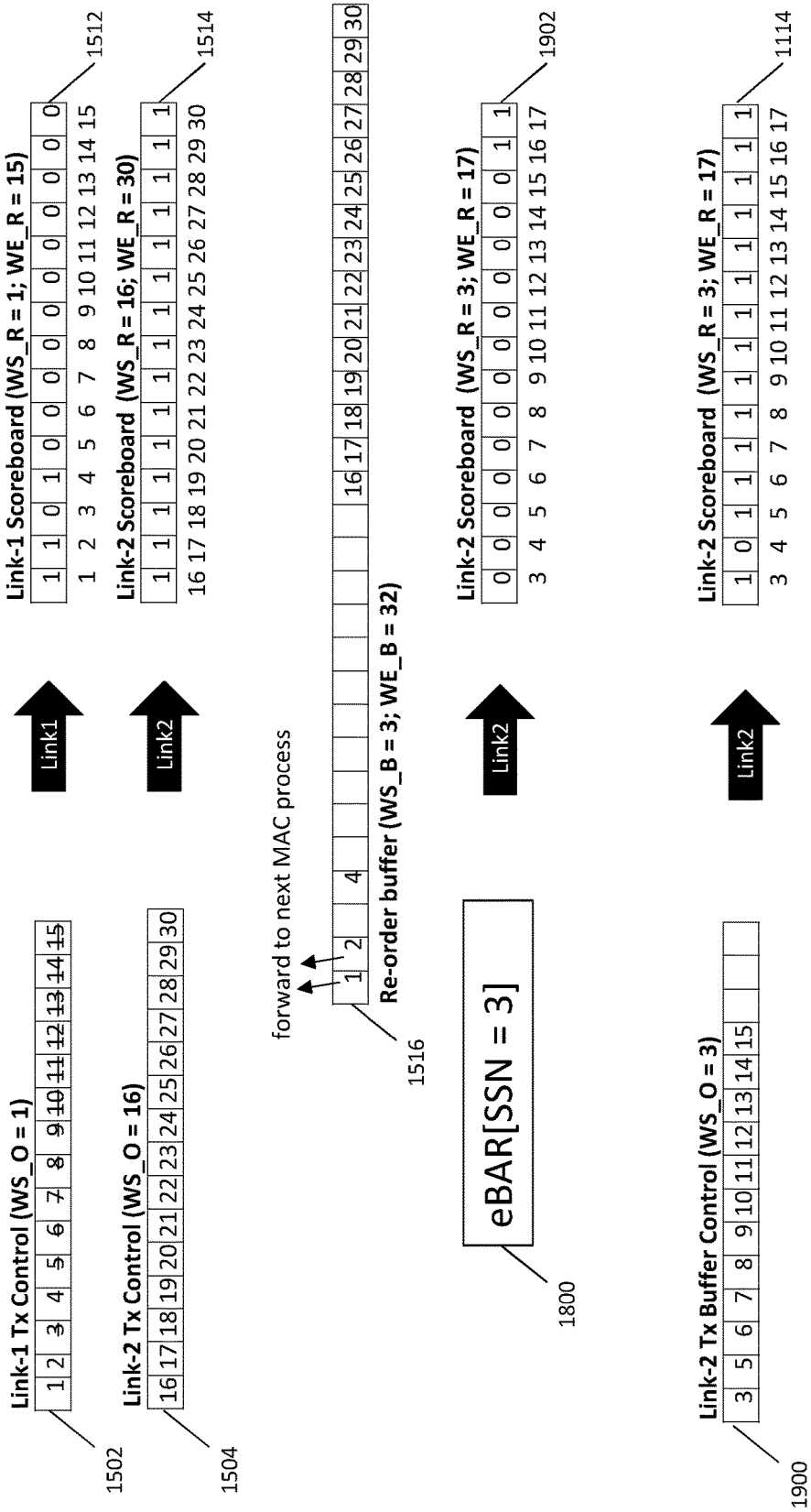
FIG. 19 depicts an illustration of how eBAR frame 1800 is utilised to resolve the issue of scoreboard context out of range as previously illustrated in FIG. 15A.

FIG. 19 shows how eBAR resolves the issue of scoreboard context out of range as previously illustrated in FIG. 15A. Since the value of $WinStart_R$ for the scoreboard 1512 on Link 2=WS_R=16 after the initial transmission, if the originator MLD were to retransmit the failed MPDUs (that were originally transmitted on Link 1) on Link 2, since the SNs are less than 16, they will be discarded by the recipient MLD. To avoid this, the originator MLD transmits an eBAR 1800 with SSN=3, which is the smallest SN to be re-transmitted. The "shift $WinStart_R$" bit is set in the eBAR, hence recipient MLD shall replace the value of $WinStart_R$ for the scoreboard 1902 on Link 2 with the value of the Starting Sequence Number (SSN) sub-field of the BAR information field. Thereafter, the failed MPDUs on Link 1 may be re-transmitted on Link 2 as illustrated in 1900 without causing the scoreboard context control to become out of range. Advantageously, eBAR solves the issue of Scoreboard context control being out of range and facilitates cross-link re-transmissions.

Alternatively, if the originator MLD decides to disable Link 1 due to repeated transmission failure, it may transmit a signal to the recipient MLD to disable Link 1. Upon reception of the signal to disable Link 1, the recipient MLD may shift the Scoreboard Context Control to the left (such that $WinStart_R=$smallest SN not yet successfully received) in anticipation of the retransmission of the failed MPDUs on Link 1.

Having a common Transmit buffer control across all links of Multi-link block ack agreement, as illustrated in the BlockAck architecture of FIG. 16, will advantageously prevent the issue of Receive reordering buffer overflow (i.e. as previously shown in FIGS. 15A, 15C and 15D) at the recipient. ($WinStart_T+WinSize_T$) acts as an upper bound on the SN of the MPDU transmitted over individual links, such that Highest SN transmitted on any link$\le WinStart_T+WinSize_T$.

Figure 20:
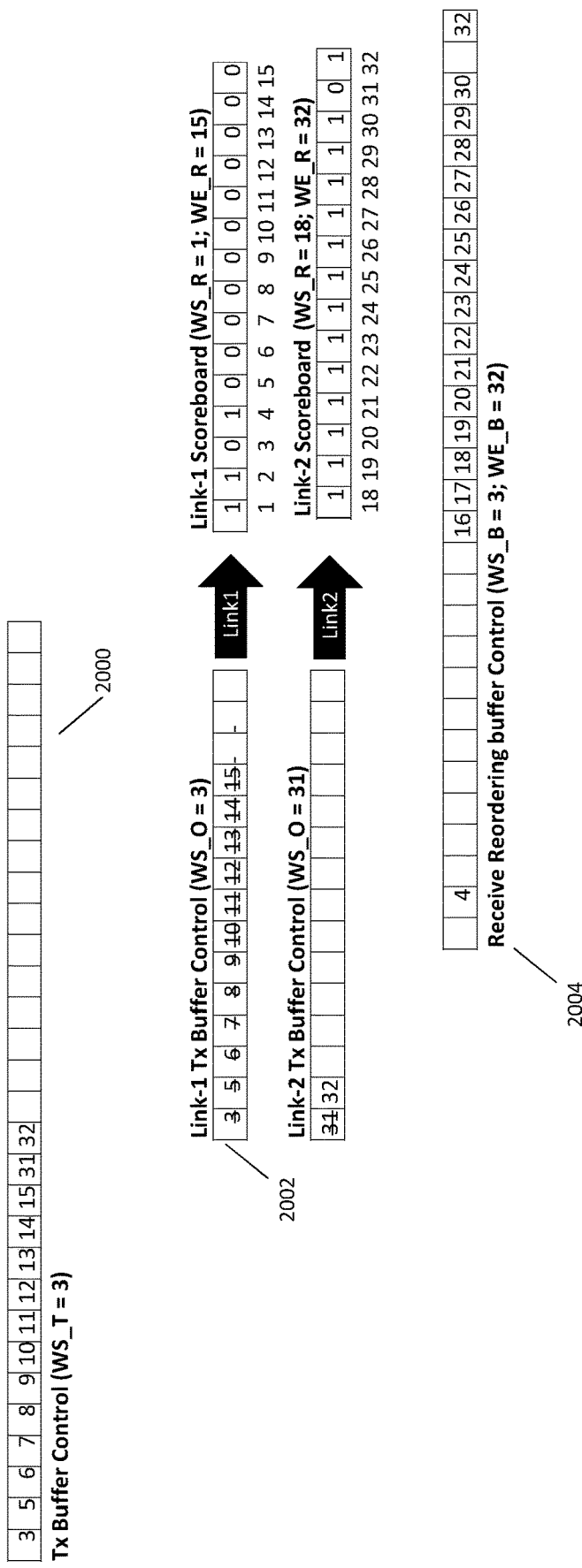
FIG. 20 depicts an illustration of how common transmit buffer control of multi-link Block Ack architecture 1600 prevents the receive reordering buffer overflow issue as shown in FIGS. 15C and 15D.

FIG. 20 illustrates how the common transmit buffer control prevents the receive reordering buffer overflow issue as shown in FIGS. 15A, 15C and 15D. Here, $WinStart_T$ refers to the starting of the transmit window (i.e. WS_T) and is equal to the smallest SN that is yet to be acknowledged by the recipient MLD as successfully received. As seen in common transmission buffer control 2000, MPDUs that previously failed transmission on Link 1 (i.e. MPDUs with SNs 3 and 5 to 15) are re-transmitted on Link 1. The highest SN that can be safely transmitted across all links is capped by the common transmit window size ($WinSize_T$): Highest SN=$WinSitart_T+WinSize_T-1=32$.

$WinSize_T$ is set to the buffer size value of the Receive Reorder Buffer control 2004 and hence having the above rule ensures that the MPDUs transmitted by the originator MLD will never overflow the Receive Reorder Buffer at the recipient MLD. Now if the failed MPDUs on Link-1 are retransmitted on Link-1 as shown in FIG. 15D, they can be safely received at the recipient side. If the originator MLD gives up on transmission of MPDUs (for example due to repeated transmission failures or due to expiry of the MPDU lifetime), the originator MLD may shift the transmit window to the right by transmitting a BlockAck Request frame with the SSN set to the value of the next MPDU to be transmitted. This causes WinStart$_T$ and WinStart$_O$ of the link to be set to SSN at the originator MLD, and also causes the recipient MLD to shift both the scoreboard and the receive window to the right by setting WinStart$_R$ (i.e. WS_R) and WinStart$_B$ (i.e. WS_B) to SSN. Subsequently, the transmission of MPDUs with higher SN may be resumed. Advantageously, cross-link re-transmissions are possible without overflowing the receive buffer.

Figure 21:
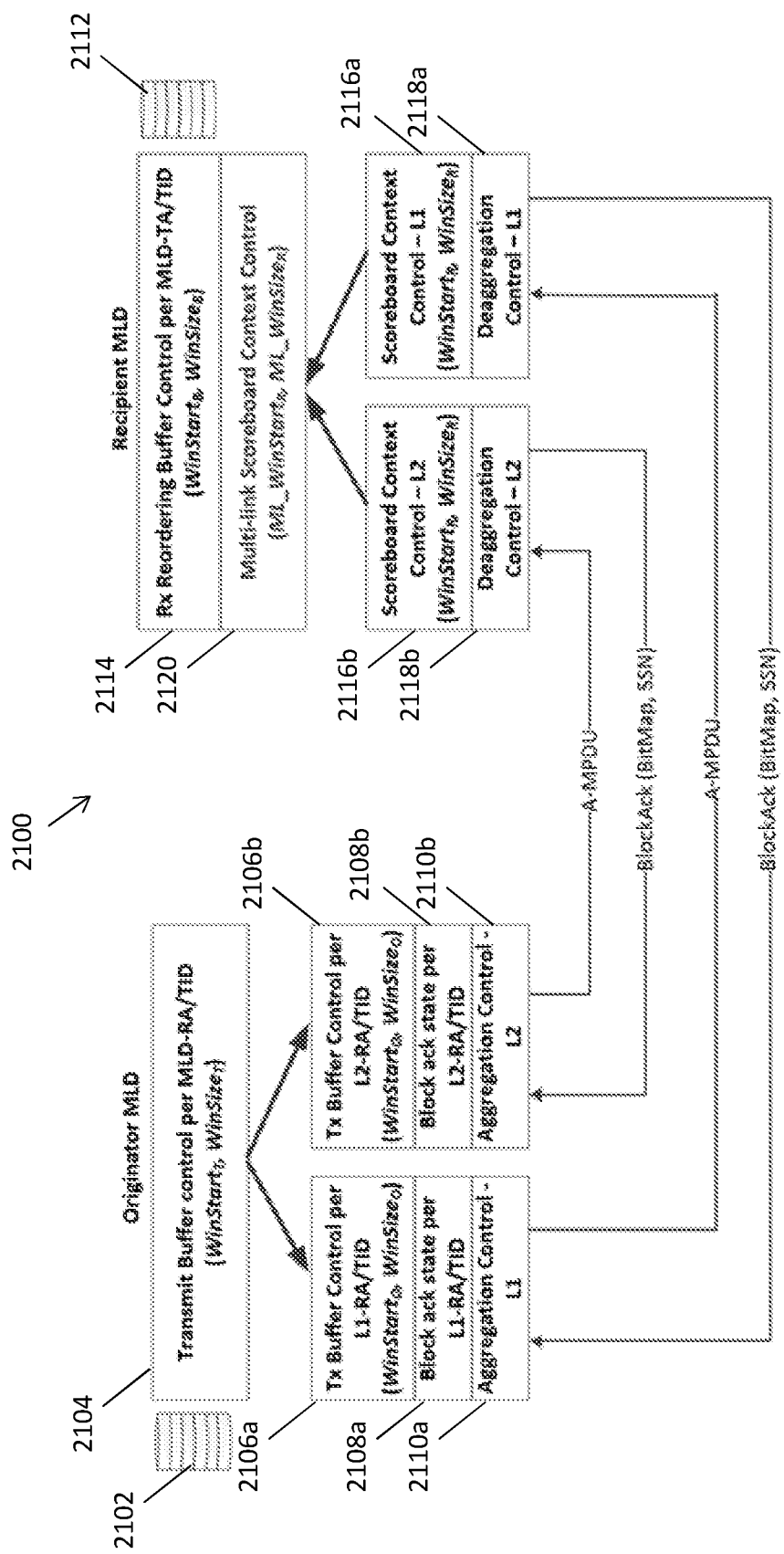
FIG. 21 depicts an illustration of a multi-link Block Ack architecture 2100 with a common Multi-link scoreboard context control in accordance with a variant of the present embodiments.

In accordance with another embodiment, if the recipient MLD supports consolidated block ack across multiple links, a common Multi-link scoreboard context control may be used to combine the scoreboard context controls of individual links. FIG. 21 illustrates a block ack architecture 2100 in accordance with this embodiment which is a variation of the block ack architecture 1600 illustrated in FIG. 16, While the two architectures are mostly the same, a main difference is that the recipient MLD in architecture 2100 now comprises a multi-link scoreboard context control 2120 of a size (ML_WinStart$_R$, ML_WinSize$_R$). ML_WinStart$_R$ is a minimum WinStart$_R$ across all links of a multi-link block ack agreement negotiated by the originator MLD and the recipient MLD, such that the ML_WinSize$_R$≥sum of WinSize$_R$ across all links of the multi-link block ack agreement Another difference is that the originator MLD in architecture 2100 only maintains one common transmit buffer 2100 that is shared among all links.

Architecture 2100 is based on a premise that it is possible for the two-tier transmit buffer control to be performed without separate per-link transmit buffers such as the transmit buffers 1602b and 1602c for link 1 and link 2 respectively of the block ack architecture 1600. For example, the buffer in architecture 2100 is only a common transmit buffer 2102 and the two-tier transmit buffer control is performed by address/pointers management.

The multi-link scoreboard context control 2120 may operate with the following rules for reception of data frames:
If ML_WinStart$_R$<=SN<=ML_WinEnd$_R$: set to 1 the bit in position SN within the bitmap.
If ML_WinEnd$_R$<SN<ML_WinEnd$_R$+2$^{11}$:
1) set to 0 bits with SN values from ML_WinEnd$_R$+1 to SN−1
2) ML_WinEnd$_R$=SN
3) ML_WinStart$_R$=SN−ML_WinSize$_R$
4) set to 1 the bit at position SN in the bitmap.
If ML_WinEnd$_R$+2$^{11}$<=SN<=ML_WinEnd$_R$: make no change Further, the multi-link scoreboard context control 2120 may operate with the following rules for reception of multi-link BlockAckReq (ML_BAR) frames:
If ML_WinStart$_R$<=SSN<=ML_WinEnd$_R$:
1) ML_WinStart$_R$=SSN
2) set to 0 bits with SN values from ML_WinEnd$_R$+1 to ML_WinSize$_R$−1
3) ML_WinEnd$_R$=ML_WinStart$_R$+ML_WinSize$_R$−1
If ML_WinEnd$_R$<SSN<ML_WinEnd$_R$+2$^{11}$:
1) ML_WinStart$_R$=SSN
2) ML_WinEnd$_R$=ML_WinStart$_R$+ML_WinSize$_R$−1
3) set to 0 bits with SN values from ML_WinStart$_R$ to ML_WinEnd$_R$
If ML_WinEnd$_R$+2$^{11}$<=SSN<=ML_WinEnd$_R$: make no change
The rules for the update of Receive Reordering Buffer Control upon receipt of multi-link BAR (ML_BAR) frames are the same as receipt of BAR frames. Further, receipt of per-link BAR does not affect the ML_scoreboard, while receipt of ML_BAR does not affect the per-link scoreboard. In both the architectures shown in FIG. 16 as well as the one in FIG. 21, although it is advantageous to implement a separate Transmit Buffer Control 1604 or 2104, it is also possible that instead of maintaining such a record (WinStart$_T$, WinSize$_T$) the Originator MLD performs control of the transmissions across multiple links by referring to the records of each per-link Transmit Buffer Controls prior to each transmission to ensure that the receive reorder buffer at the recipient is not overflowed. The Originator MLD ensures that the difference between the smallest WinStart$_T$ across all links and the largest value of (WinStart$_T$+WinStart$_T$) across all links is not larger than WinSize$_B$. In summary, the purpose of having the common Transmit Buffer Control is to ensure that the transmissions of MPDUs across different links do not cause issues for the recipient MLD, for example overflow of receive reorder buffer.

Figure 22A:
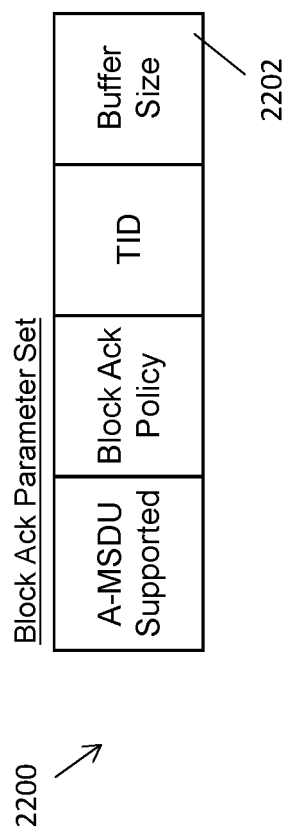
FIGS. 22A and 22B depicts an illustration of a multi-link Block Ack Parameter Set 2200 and Multi-band element 2210 for use with the Block Ack architecture 2100 in accordance with the present embodiments.
Figure 22B:
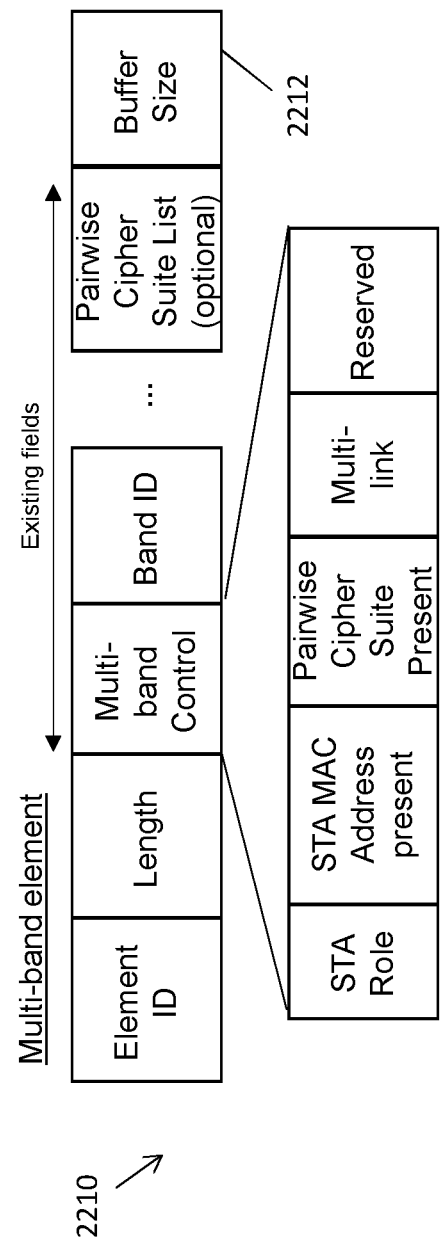

FIG. 22A shows a Block Ack Parameter Set (i.e. a field in ADDBA request frame 810 as shown in FIG. 8) and FIG. 22B shows a Multi-band element (i.e. a field in ADDBA response frame 820 as shown in FIG. 8) in accordance with the block ack architecture 2100 as illustrated in FIG. 21. Block Ack Parameter set 2200 includes a buffer size field 2202 which in the ADDBA response frame indicates the size of the receive reordering buffer (i.e. WinSize$_B$). ADDBA Request/Response frames carry one Multi-band element for each link of the Multi-link block ack agreement (including the link on which the frames are transmitted). Multi-band element 2210 now includes a buffer size field 2212 which in the ADDBA response frame indicates the size of the scoreboard context control (WinSize$_R$) of the link represented by the Multi-band element 2210. Each Multi-band element 2210 identifies one link of the multi-link block ack agreement.

In accordance with the architecture 2100 as illustrated in FIG. 21, WinSize$_T$=WinSize$_B$≥sum of WinSize$_R$ across all links of the multi-link block ack agreement negotiated by the originator MLD and the recipient MLD. A receive reordering buffer size bigger than the sum of the receive buffer across all links may be negotiated to account for differences in the link throughputs. Further, the size of the receive reorder buffer may be negotiated independent of the size of the per-link scoreboard. Such implementation may help to reduce the chances of the receive reorder buffer overflows due to the differences in the link bandwidths etc. as explained earlier by being able to accommodate more MPDUs received over fast links without overflowing while still being able to receive MPDUs from slower links. However, it has to be appreciated that even though the bigger size of the receive reordering buffer may help to mitigate some cases of overflow of receive reordering buffer, it alone cannot completely avoid the risk of overflow of receive reordering buffer and regardless of the size of the receive reordering buffer negotiated during the multi-link Block Ack agreement, some sort of central control of the transmissions across different links at the originator side will be necessary.

Figures 23A, 23B, 23C:
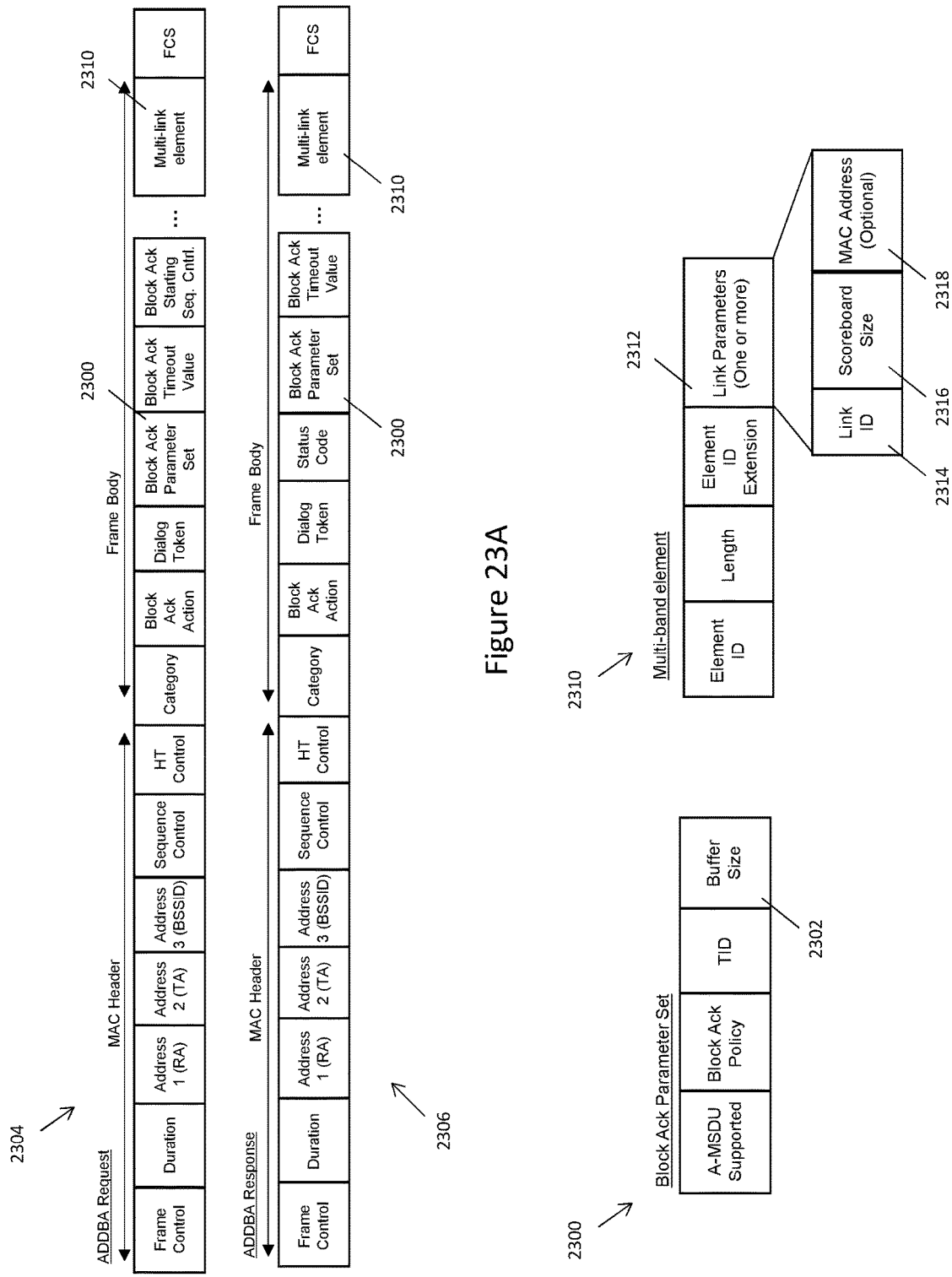
FIG. 23A to 23C depicts an illustration of an ADDBA request frame 2304, ADDBA response frame 2306, Block Ack Parameter Set 2300 and Multi-link element 2310 in accordance with another variant of the present embodiments.

In accordance with yet another embodiment, ADDBA Request and Response frames may carry a Multi-link element that specify the parameters related to all the links of the Multi-link block ack agreement negotiated between the originator MLD and the recipient MLD. Referring to FIGS. 23A, 23B and 23C, ADDBA request frame 2304 and ADDBA response frame 2306 may comprise a Block Ack Parameter Set field 2300 that contains a buffer size field 2302. The buffer size field 2302 indicates the size of the receive reordering buffer (WinSize$_B$). ADDBA request frame 2304 and ADDBA response frame 2306 may also comprise a Multi-link element field 2310 that contains one or more Link Parameters field 2312. The one or more Link Parameters field may each comprise a Link ID field 2314, a Scoreboard Size field 2316 and an optional MAC Address field 2318. The Link ID field 2314 identifies the associated link, where the Link ID may be assigned during multi-link setup/association or during a separate link setup procedure after association. The Scoreboard Size field 2316 in Multi-link element 2310 in the ADDBA response frame 2306 indicates the size of the Scoreboard context control (WinSize$_R$) of the link represented by the associated Link ID as identified in the Link ID field 2314. In the current embodiment, WinSize$_T$=WinSize$_B$≥sum of WinSize$_R$ across all links of the multi-link block ack agreement.

Figure 24:
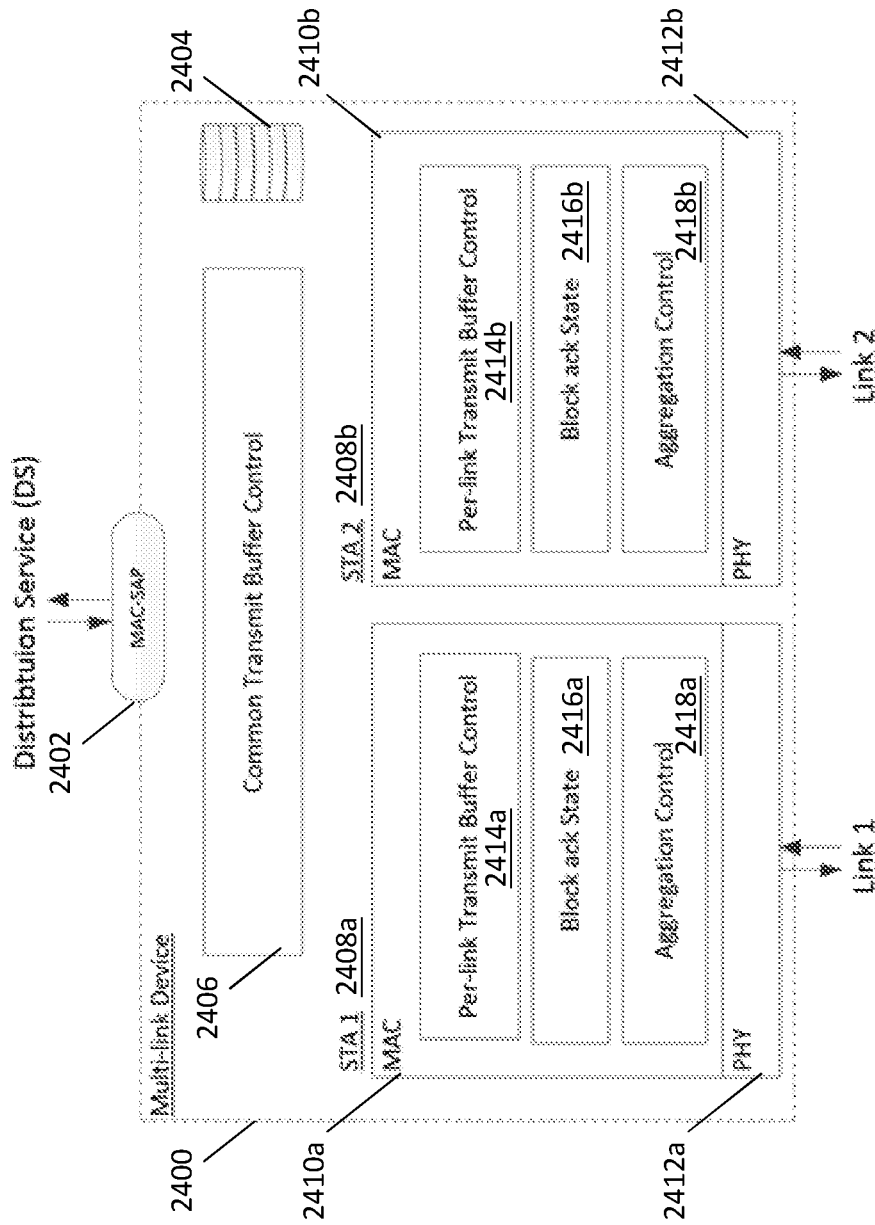
FIG. 24 depicts a schematic of an originator MLD 2400 in accordance with various embodiments.

FIG. 24 shows a schematic of an originator MLD 2400 in accordance with various embodiments. The originator MLD comprises a common transmit buffer control 2406 with a common transmit buffer 2404 (i.e. the common transmit buffer control 1604 with common transmit buffer 1602a in originator MLD of architecture 1600, as well as common transmit buffer control 2104 with common transmit buffer 2102 in originator MLD of architecture 2100) and a MAC-SAP 2402 for performing distribution service (DS). The originator MLD 2400 comprises two affiliated STAs or stations, STA1 2408a and STA2 2408b. STA1 2408a comprises at MAC layer a per-link Transmit Buffer Control 2414a, a Block ack state 2416a and an Aggregation Control 2418a (i.e similar to transmit buffer control 1606a, block ack state 1608a and aggregation control 1610a in architecture 1600, and transmit buffer control 2106a, block ack state 2108a and aggregation control 2110a in architecture 2100). Likewise, STA2 2408b comprises at MAC layer a per-link Transmit Buffer Control 2414b, a Block ack state 2416b and an Aggregation Control 2418b (i.e. similar to transmit buffer control 1606b, block ack state 1608b and aggregation control 1610b in architecture 1600, and transmit buffer control 2106b, block ack state 2108b and aggregation control 2110b in architecture 2100). Both STAs comprise a PHY layer from which transmission via Link 1 (for STA1 2408a) and Link 2 (for STA2 2408b) occurs. It will be appreciated that the number of links and affiliated STAs or stations may be further expanded.

Figure 25:
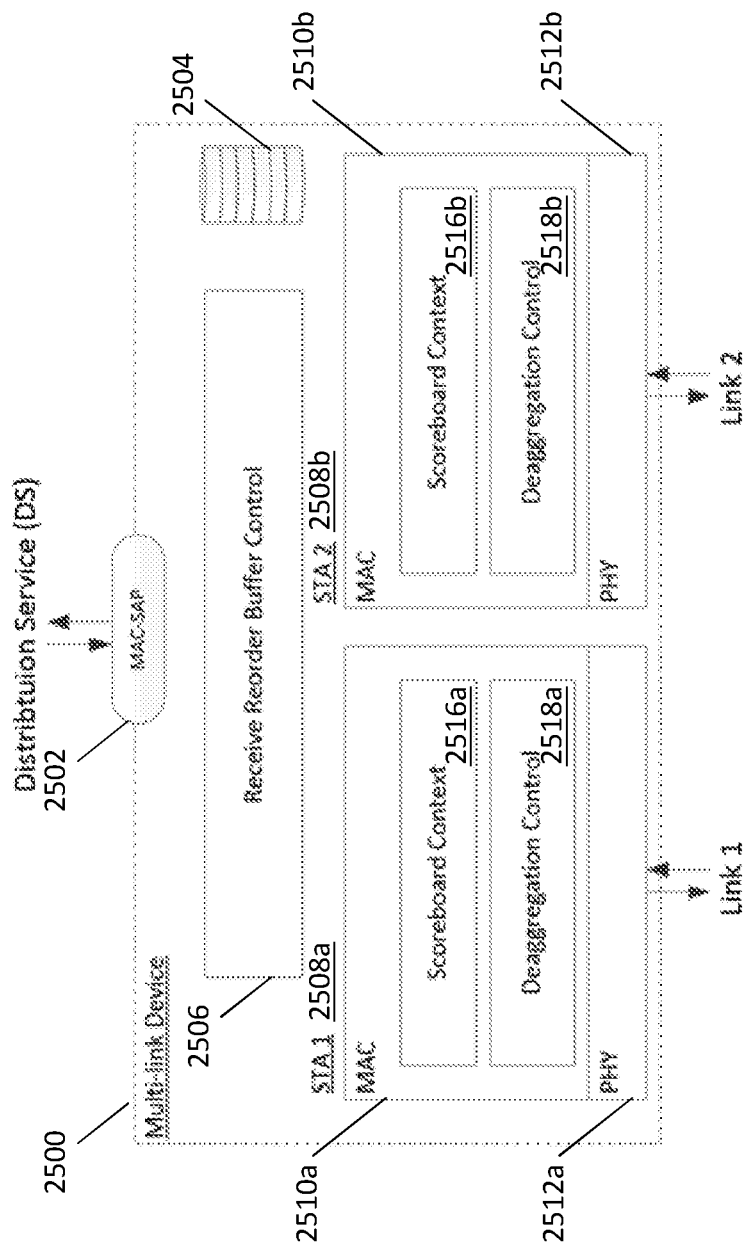
FIG. 25 depicts a schematic of a recipient MLD 2500 in accordance with various embodiments.

FIG. 25 shows a schematic of a recipient MLD 2500 in accordance with various embodiments. The recipient MLD comprises a receive reorder buffer control 2506 with a receive reorder buffer 2504 (i.e. the receive reorder buffer control 1614 with receive reorder buffer 1612 in recipient MLD of architecture 1600, as well as receive reorder buffer control 2114 with receive reorder buffer 2112 in recipient MLD of architecture 2100) and a MAC-SAP 2502 for performing distribution service (DS). The recipient MLD 2500 comprises two affiliated STAs or stations, STA1 2508a and STA2 2508b. STA1 2508a comprises at MAC layer a Scoreboard Context control 2516a and a Deaggregation Control 2518a (i.e. similar to scoreboard context control 1616a and deaggregation control 1618a in architecture 1600, and scoreboard context control 2116a and deaggregation control 2118a in architecture 2100). Likewise, STA2 2508b comprises at MAC layer a Scoreboard Context Control 2516b and a Deaggregation Control 2518b (i.e. similar to scoreboard context control 1616b and aggregation control 1618b in architecture 1600, and scoreboard context control 2116b and aggregation control 2118b in architecture 2100). Both STAs comprise a PHY layer from which transmission via Link 1 (i.e. between STA1 2508a and STA1 2408a at the originator MLD 2400) and Link 2 (i.e. between STA2 2508b and STA2 2408b at the originator MLD 2400) occurs. It will be appreciated that the number of links and affiliated STAs or stations may be further expanded.

Figure 26:
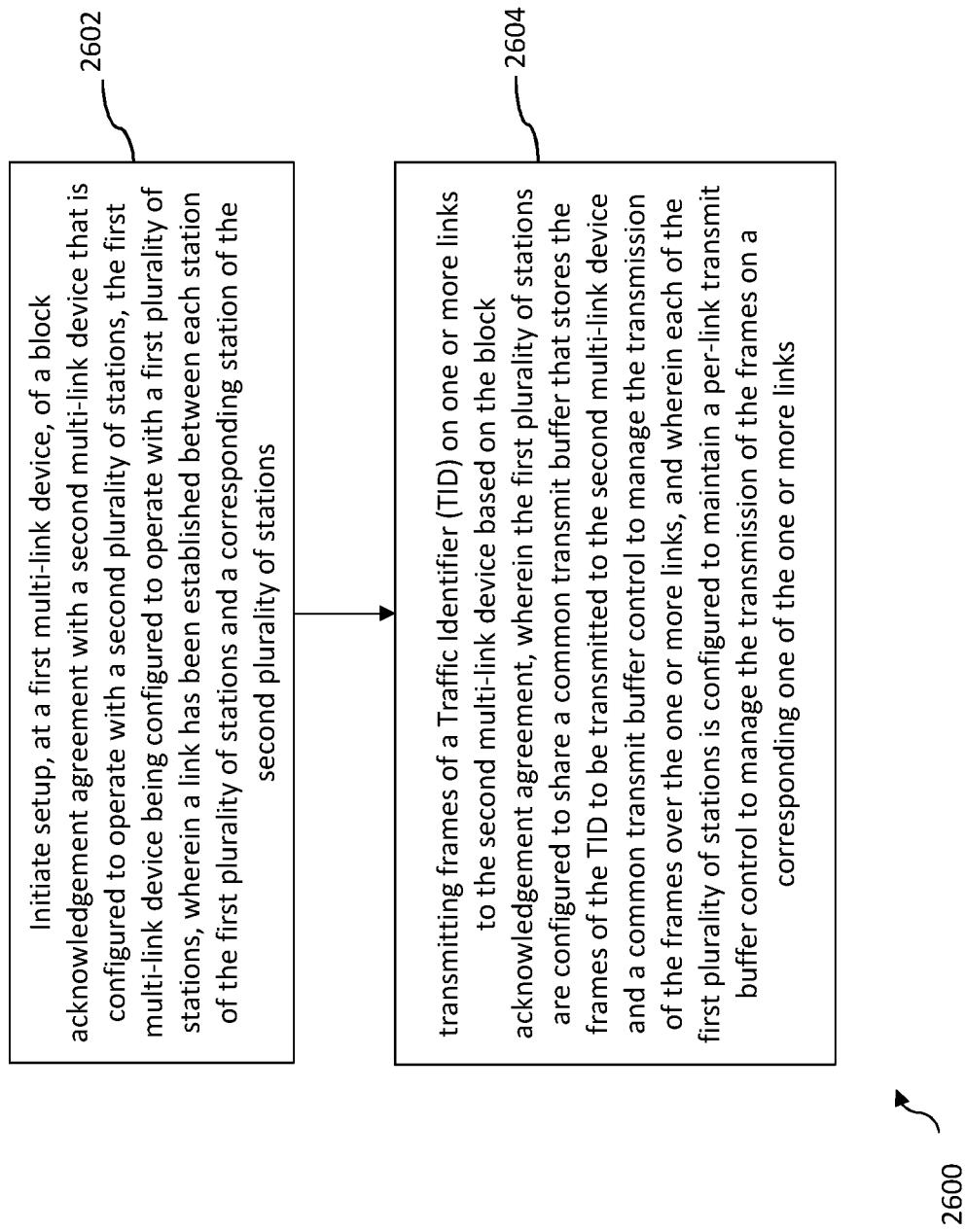
FIG. 26 shows a flow diagram 2600 illustrating a method for multi-link communication according to various embodiments.

FIG. 26 shows a flow diagram 2600 illustrating a method for multi-link communication according to various embodiments. In step 2602, setup is initiated, at a first multi-link device, of a block acknowledgement agreement with a second multi-link device that is configured to operate with a second plurality of stations, the first multi-link device being configured to operate with a first plurality of stations, wherein a link has been established between each station of the first plurality of stations and a corresponding station of the second plurality of stations. In step 2604, frames of a Traffic Identifier (TID) are transmitted on one or more links to the second multi-link device based on the block acknowledgement agreement, wherein the first plurality of stations are configured to share a common transmit buffer that stores the frames of the TID to be transmitted to the second multi-link device and a common transmit buffer control to manage the transmission of the frames over the one or more links, and wherein each of the first plurality of stations is configured to maintain a per-link transmit buffer control to manage the transmission of the frames on a corresponding one of the one or more links.

Figure 27:
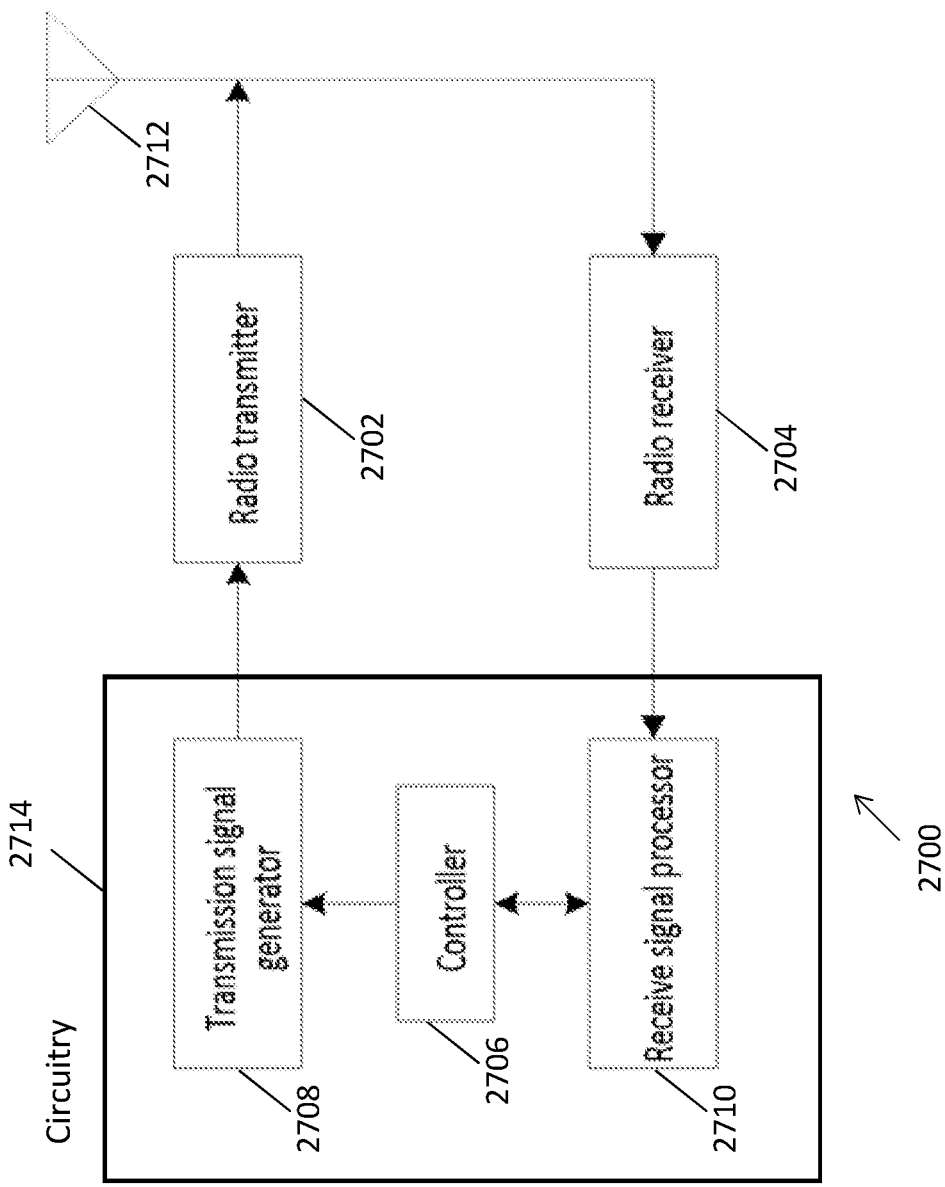
FIG. 27 shows a schematic, partially sectioned view of a multi-link device 2700 that can be implemented for multi-link communication in accordance with various embodiments as shown in FIGS. 1 to 26.

FIG. 27 shows a schematic, partially sectioned view of a multi-link device 2700 that can be implemented for multi-link communication in accordance with various embodiments as shown in FIGS. 1 to 26. The multi-link device 2700 may be implemented as an AP MLD or non-AP MLD, and comprising one or more affiliated stations or STAs according to various embodiments.

Various functions and operations of the multi-link device 2700 are arranged into layers in accordance with a hierarchical model. In the model, lower layers report to higher layers and receive instructions therefrom in accordance with IEEE specifications. For the sake of simplicity, details of the hierarchical model are not discussed in the present disclosure.

As shown in FIG. 27, the multi-link device 2700 may include circuitry 2714, at least one radio transmitter 2702, at least one radio receiver 2704 and multiple antennas 2712 (for the sake of simplicity, only one antenna is depicted in FIG. 27 for illustration purposes). The circuitry may include at least one controller 2706 for use in software and hardware aided execution of tasks it is designed to perform, including control of communications with one or more other multi-link devices in a MIMO wireless network. The at least one controller 2706 may control at least one transmission signal generator 2708 for generating ADDBA action frames such as ADDBA request frames and/or ADDBA response frames to be sent through the at least one radio transmitter 2702 to one or more other multi-link devices and at least one receive signal processor 2710 for processing ADDBA action frames such as ADDBA request frames and/or ADDBA response frames received through the at least one radio receiver 2704 from the one or more other multi-link devices. The at least one transmission signal generator 2708 and the at least one receive signal processor 2710 may be stand-alone modules of the multi-link device 2700 that communicate with the at least one controller 2706 for the above-mentioned functions. Alternatively, the at least one transmission signal generator 2708 and the at least one receive signal processor 2710 may be included in the at least one controller 2706. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 2702, at least one radio receiver 2704, and at least one antenna 2712 may be controlled by the at least one controller 2706. Furthermore, while only one radio transmitter 2702 is shown, it will be appreciated that there can be more than one of such transmitters i.e. one transmitter for each affiliated station or STA of the multi-link device 2700.

As shown in FIG. 27, the at least one radio receiver 2704, together with the at least one receive signal processor 2710, forms a receiver of the multi-link device 2700. The receiver of the multi-link device 2700, when in operation, provides functions required for multi-link communication. While only one radio receiver 2704 is shown, it will be appreciated that there can be more than one of such receivers i.e. one receiver for each affiliated station or STA of the multi-link device 2700.

The multi-link device 2700, when in operation, provides functions required for multi-link communication. For example, the multi-link device 2700 may be a first multi-link device configured to operate with a first plurality of affiliated stations. The circuitry 2714 may, in operation, initiate setup of a block acknowledgement agreement with a second multi-link device that is configured to operate with a second plurality of affiliated stations, wherein a link has been established between each station of the first plurality of stations and a corresponding station of the second plurality of stations. The transmitter 2702 may, in operation, transmit frames of a Traffic Identifier (TID) on one or more links to the second multi-link device based on the block acknowledgement agreement, wherein the first plurality of stations are configured to share a common transmit buffer that stores the frames of the TID to be transmitted to the second multi-link device and a common transmit buffer control to manage the transmission of the frames over the one or more links, and wherein each of the first plurality of stations is configured to maintain a per-link transmit buffer control to manage the transmission of the frames on a corresponding one of the one or more links.

Each of the first plurality of stations may be configured to maintain a separate per-link transmit buffer to store the frames to be transmitted on the corresponding one of the one or more links. The circuitry 2714 may be configured to store the frames in the common transmit buffer until they are acknowledged by the second multi-link device as successfully received or until they are discarded at the end of a MAC Service Data Unit (MSDU) lifetime, the first plurality of stations storing frames in the per-link transmit buffer only for the duration of a transmit opportunity (TXOP).

The common transmit buffer control may be used to prevent overflow of a receive reordering buffer that is maintained by the second multi-link device due to a transmission of frames over the one or more links; the per-link transmit buffer control being used to prevent overflow of a block acknowledgment record maintained by each of the second plurality of stations due to transmission of the frames over the one of the one or more links. Further, a size of the received reordering buffer that is managed by the second multi-link device may be negotiated independently.

The circuitry 2714 may be configured to negotiate the block acknowledgement agreement with the second multi-link device by exchanging ADDBA action frames over the one of the one or more links, wherein a size of a block acknowledgment record maintained by each station of the second plurality of stations is independently negotiated.

Further, the circuitry may be configured to transmit a BlockAckReq frame to the second multi-link device on the one of the one or more links to solicit a BlockAck frame, wherein the BlockAckReq frame is configured to indicate whether or not a starting point of a block acknowledgment record maintained by one of the second plurality of stations should be replaced with a value of a Starting Sequence Number (SSN) carried in the BlockAckReq frame.

Figure 28:
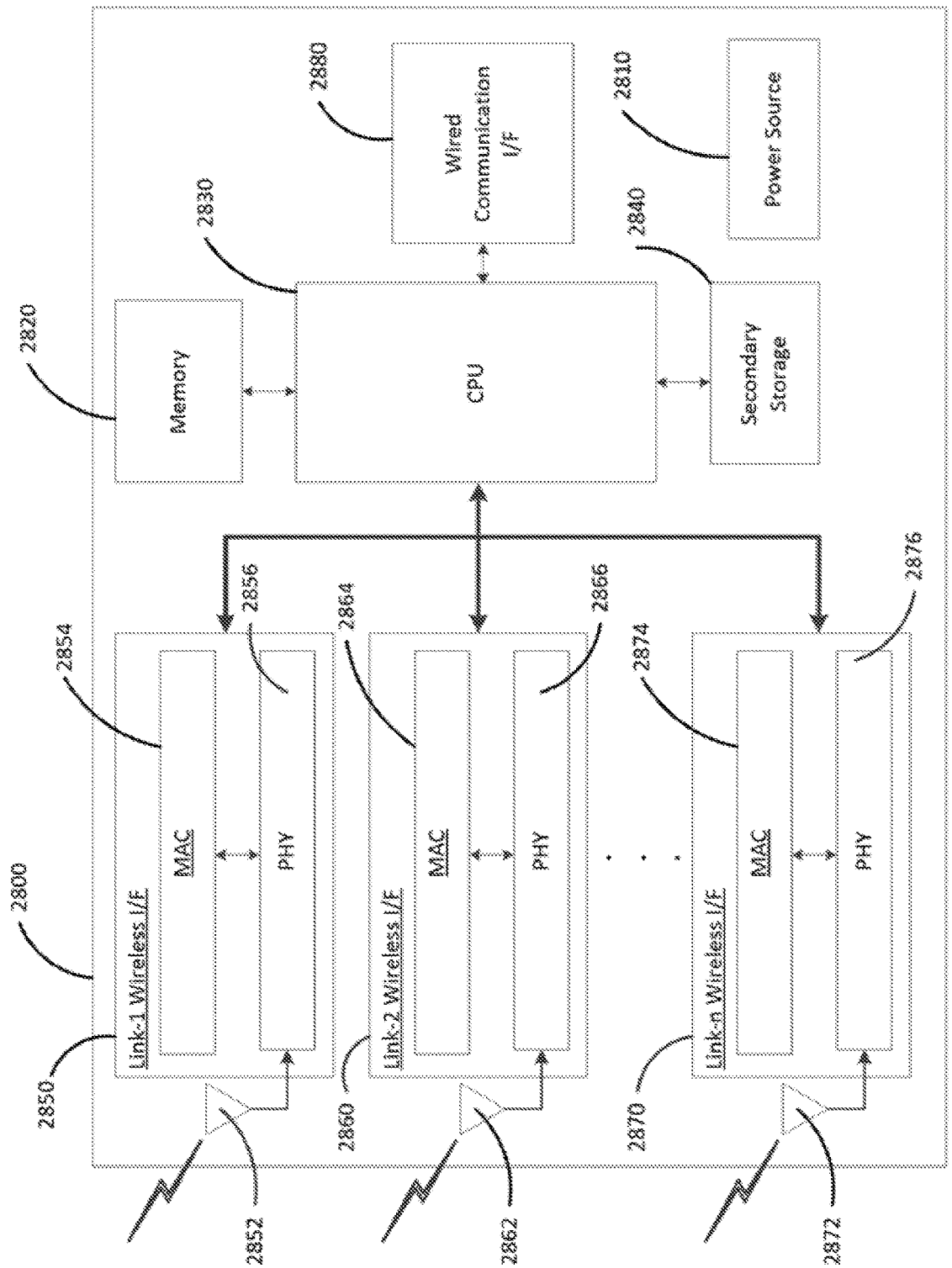
FIG. 28 depicts a detailed block diagram of a multi-link device in accordance with the present embodiments.

FIG. 28 depicts a detailed block diagram 2800 of a multi-link device 2802 in accordance with the present embodiments. Each of a plurality of Wireless I/Fs 2810, 2820, 2830 implement both a respective one of the Physical layer (PHY) processing modules 2816, 2826, 2836 and a respective one of Lower MAC function modules 2812, 2822, 2832. The function of the Wireless I/Fs 2810, 2820, 2830 may be the same as that of affiliated STAs 1280, 1282, 1284, 1286, 1288 and 1290 in FIG. 12B if such an architecture is implemented. The Upper MAC functions may be implemented as software within a central processing unit (CPU) 2840 which, in operation, may be coupled to a memory 2842 that may be used to store the multi-band BA scoreboard, a secondary storage 2844 and a wired communication I/F 2846 for communicating with external networks, other APs 102 or other MLDs. A power source 2848 provides power for the AP 2802. If the architecture as shown in FIG. 12B is implemented, the Upper MAC functions are fulfilled by the MLD.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication device.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

As a non-limiting example of an architecture (for example, the architectures as illustrated in FIGS. 12A, 12B, 16 21 and 28), the MLD of the present disclosure can be logical and realized by a plurality of separated communication apparatuses sharing a common MAC data service interface to an upper layer.

A non-limiting example of a station may be one included in a first plurality of stations affiliated with a multi-link station logical entity (i.e. such as an MLD), wherein as a part of the first plurality of stations affiliated with the multi-link station logical entity, stations of the first plurality of stations share a common medium access control (MAC) data service interface to an upper layer, wherein the common MAC data service interface is associated with a common MAC address or a Traffic Identifier (TID). The station may comprise circuitry, which in operation, initiates setup of a block acknowledgement agreement with a second multi-link device that is configured to operate with a second plurality of affiliated stations, wherein a link has been established between each station of the first plurality of stations and a corresponding station of the second plurality of stations; and a transmitter, which in operation, transmits frames of the TID on one or more links to the second multi-link device based on the block acknowledgement agreement, wherein the first plurality of stations are configured to share a common transmit buffer that stores the frames of the TID to be transmitted to the second multi-link device and a common transmit buffer control to manage the transmission of the frames over the one or more links, and wherein each of the first plurality of stations is configured to maintain a per-link transmit buffer control to manage the transmission of the frames on a corresponding one of the one or more links.

Thus, it can be seen that the present embodiments provide communication devices and methods for operation over multiple links in order to fully realize the throughput gains of multi-link communication.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

The invention claimed is:

1. An originator multi-link device (MLD), comprising:
   circuitry, which, in operation, establishes on a first link a multi-link Block Ack agreement for a plurality of links with a recipient MLD;
   a transmitter, which, in operation, transmits to the recipient MLD a plurality of MAC layer Protocol Data Units (MPDUs) with a common Traffic Identifier (TID) on one or more links among the plurality of links; and
   a receiver, which, in operation, receives a multi-link Block Ack from the recipient MLD on the first link and, in operation, receives one or more per-link Block Acks from the recipient MLD, each of the one or more per-link Block Acks indicating a reception status of a subset of the plurality of MPDUs, the subset being transmitted on one of the one or more links.

2. The originator MLD according to claim 1, wherein the multi-link Block Ack agreement is established per TID by:
   transmitting an Add Block Ack (ADDBA) Request frame on an enabled link; and
   receiving an Add Block Ack (ADDBA) Response frame on the enabled link.

3. The originator MLD according to claim 1, wherein the circuitry, in operation, maintains a single common transmit buffer control to feed the plurality of MPDUs for transmission across the one or more links.

4. The originator MLD according to claim 3, wherein the single common transmit buffer control uses WinStart and WinSize for each block acknowledgement agreement, the WinStart indicating a starting sequence number of a common transmit window for the plurality of links, and the WinSize indicating a size of a receive reordering buffer maintained by the recipient MLD.

5. The originator MLD according to claim 4, wherein the circuitry, in operation, releases a common transmit buffer associated with a successfully received MPDU upon receiving the one or more per-link Block Acks containing a reception status of the successfully received MPDU.

6. The originator MLD according to claim 1, wherein the received one or more per-link Block Acks are consolidated to a Multi-link Block Ack scoreboard to determine which of the plurality of MPDUs needs retransmission.

7. The originator MLD according to claim 6, wherein the Multi-link Block Ack scoreboard comprises a bitmap comprising a plurality of bits, each bit indicating whether a corresponding MPDU is successfully received by the recipient MLD.

8. A transmission method performed by an originator multi-link device (MLD), the transmission method comprising:
   establishing on a first link a multi-link Block Ack agreement for a plurality of links with a recipient MLD;

transmitting to the recipient MLD a plurality of MAC layer Protocol Data Units (MPDUs) with a common Traffic Identifier (TID) on one or more links among the plurality of links;
receiving a multi-link Block Ack from the recipient MLD on the first link; and
receiving one or more per-link Block Acks from the recipient MLD, each of the one or more per-link Block Acks indicating a reception status of a subset of the plurality of MPDUs, the subset being transmitted on one of the one or more links.

9. The transmission method according to claim 8, wherein the multi-link Block Ack agreement is established per TID by:
transmitting an Add Block Ack (ADDBA) Request frame on an enabled link; and
receiving an Add Block Ack (ADDBA) Response frame on the enabled link.

10. The transmission method according to claim 8, comprising:
maintaining a single common transmit buffer control to feed the plurality of MPDUs for transmission across the one or more links.

11. The transmission method according to claim 10, wherein the single common transmit buffer control uses WinStart and WinSize for each block acknowledgement agreement, the WinStart indicating a starting sequence number of a common transmit window for the plurality of links, and the WinSize indicating a size of a receive reordering buffer maintained by the recipient MLD.

12. The transmission method according to claim 11, comprising:
releasing a common transmit buffer associated with a successfully received MPDU upon receiving the one or more per-link Block Acks containing a reception status of the successfully received MPDU.

13. The transmission method according to claim 8, comprising:
consolidating the received one or more per-link Block Acks to a Multi-link Block Ack scoreboard to determine which of the plurality of MPDUs needs retransmission.

14. The transmission method according to claim 13, wherein the Multi-link Block Ack scoreboard comprises a bitmap comprising a plurality of bits, each bit indicating whether a corresponding MPDU is successfully received by the recipient MLD.

* * * * *